CARROLL J. LUCIA

Inventor
CARROLL J. LUCIA

Feb. 26, 1957     C. J. LUCIA     2,782,657
PRESSURE REGULATING SYSTEM FOR MOTOR
VEHICLE TRANSMISSION CONTROLS
Filed March 31, 1955     22 Sheets-Sheet 3
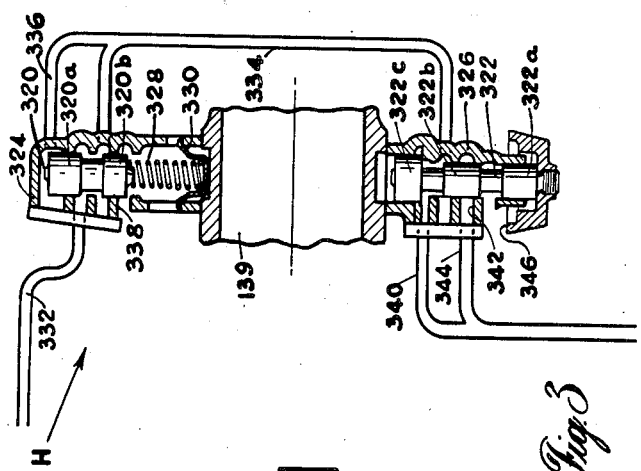
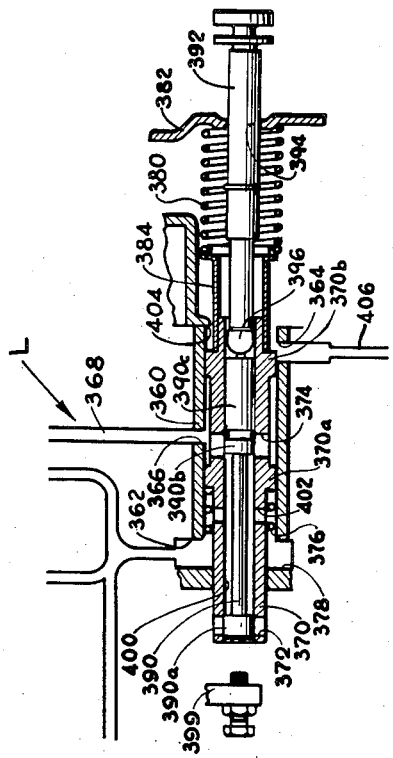
Inventor
CARROLL J. LUCIA
By Nelson, Redrow and Saeller
Attorney

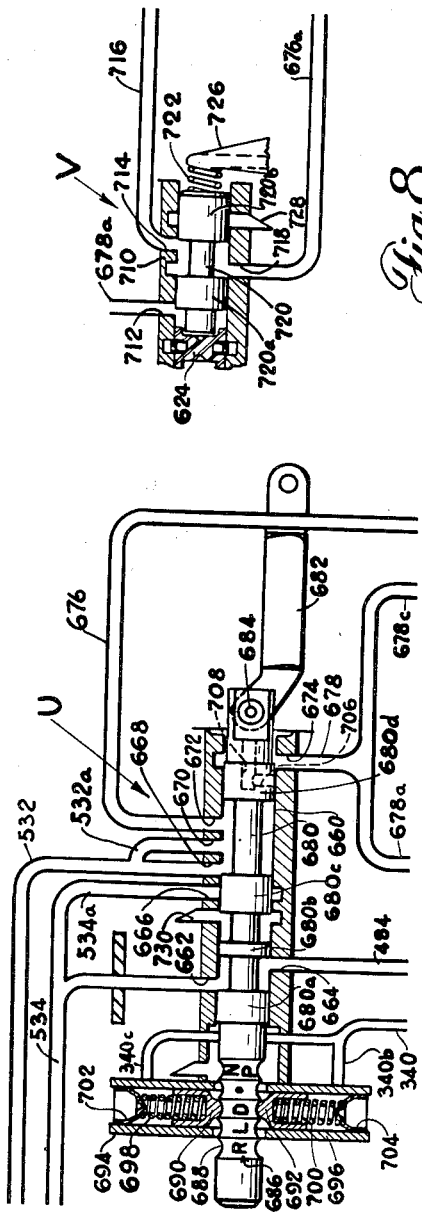

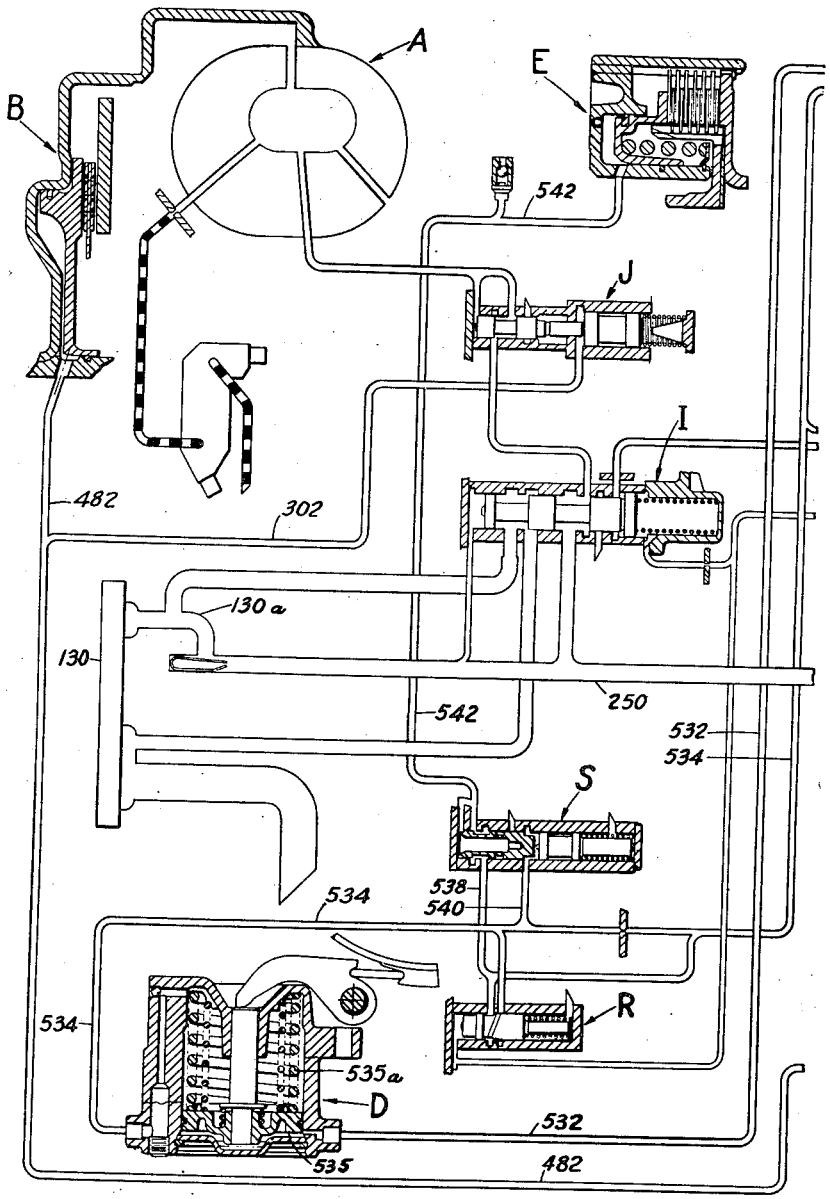

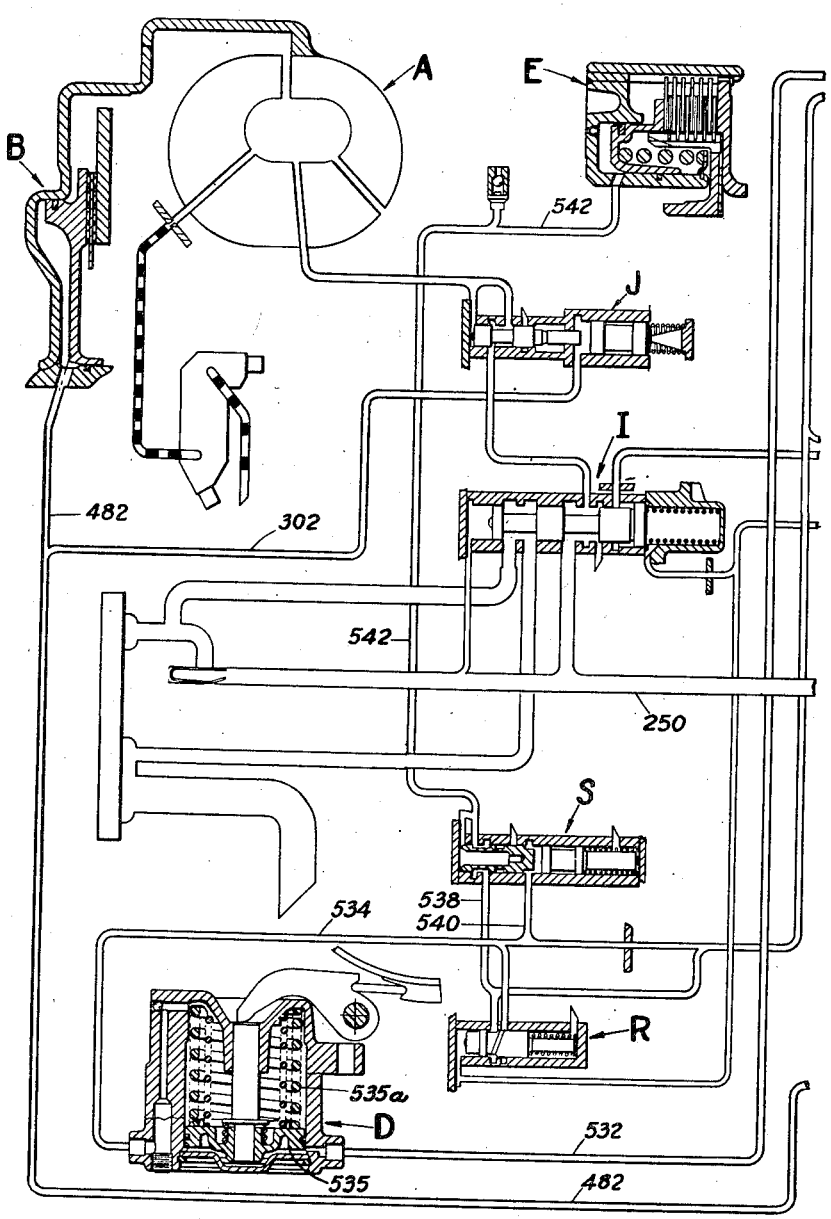

Feb. 26, 1957

C. J. LUCIA 2,782,657

PRESSURE REGULATING SYSTEM FOR MOTOR
VEHICLE TRANSMISSION CONTROLS

Filed March 31, 1955

Inventor
CARROLL J. LUCIA

By
Wilson, Redrow & Sadler
Attorney

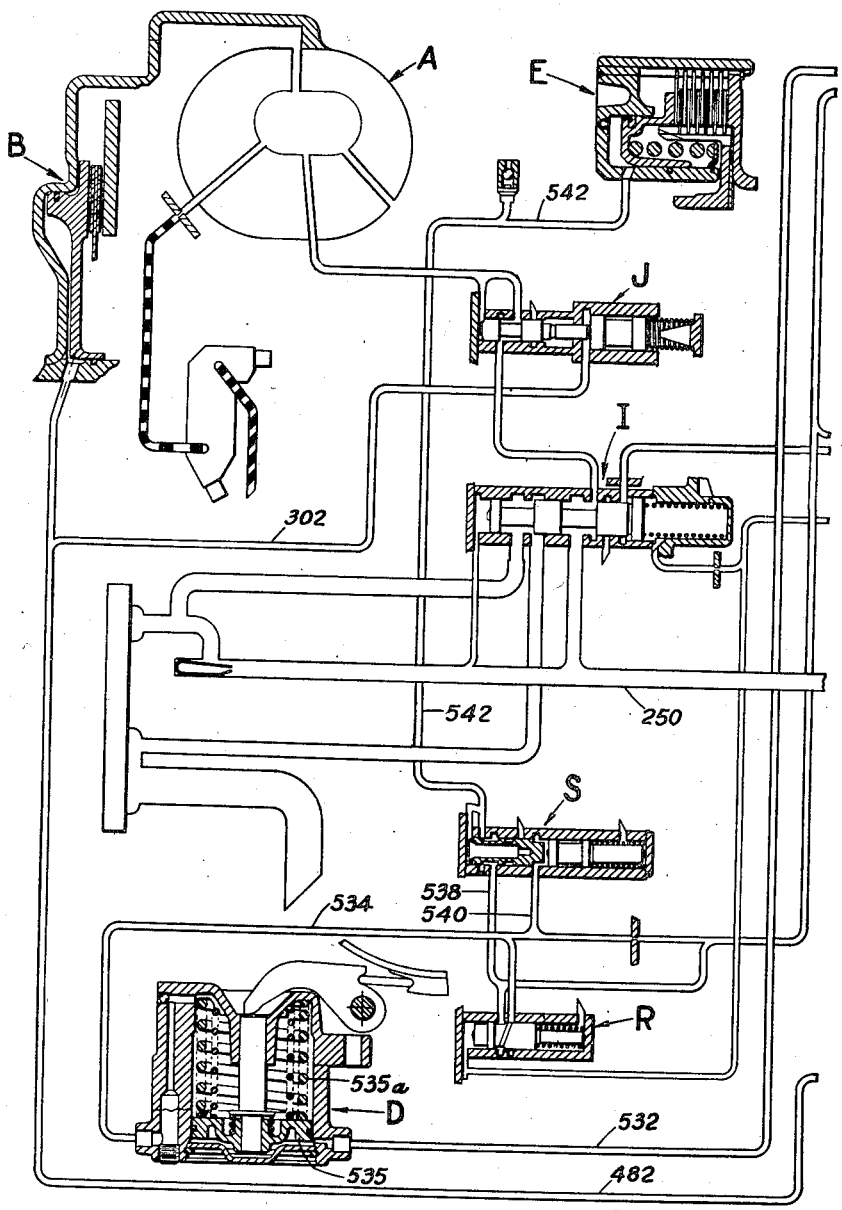

Inventor
CARROLL J. LUCIA

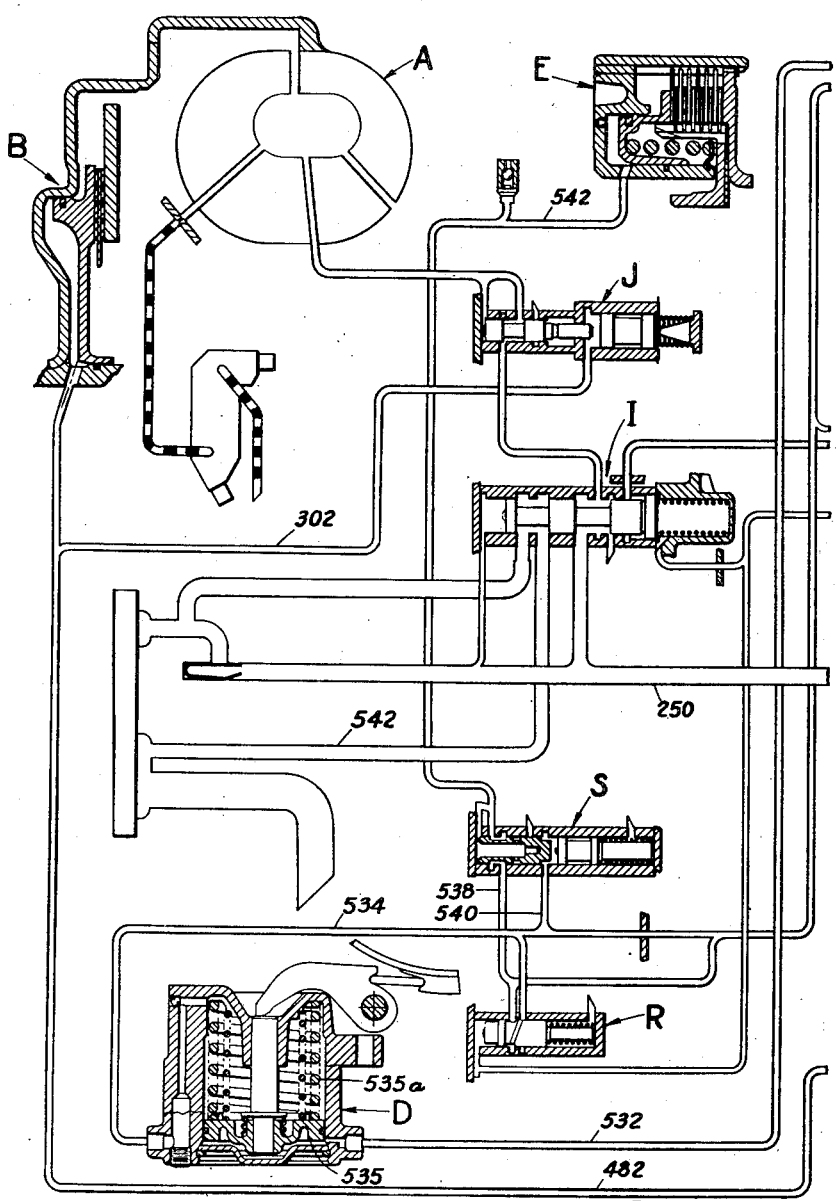

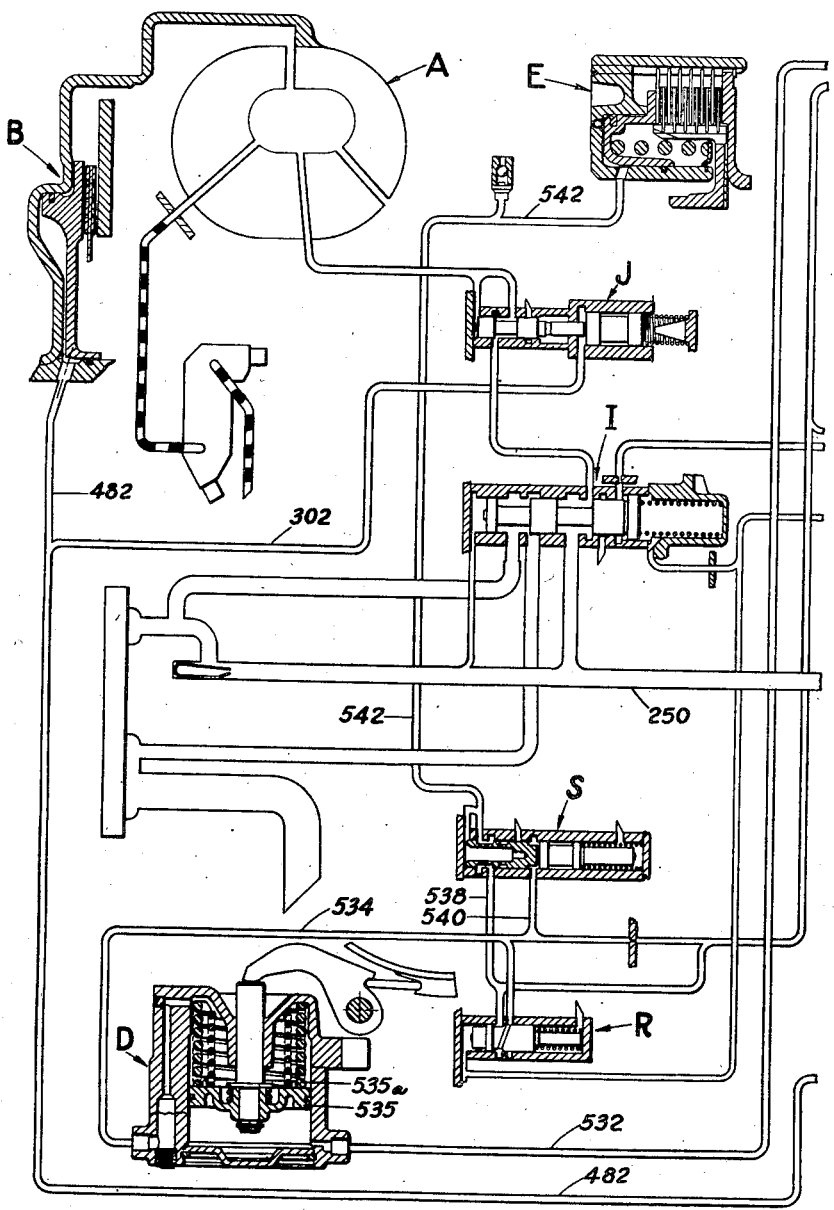

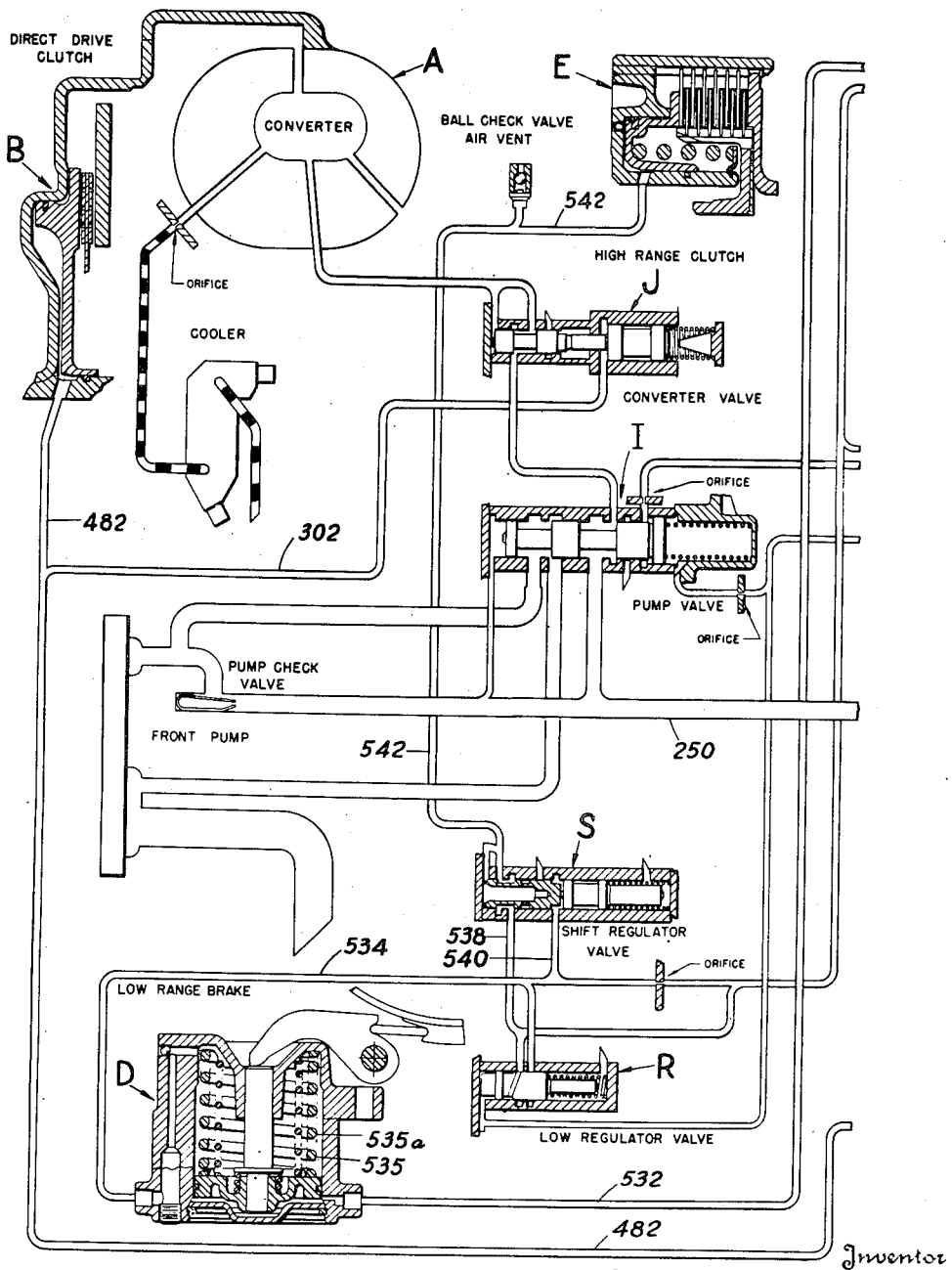

United States Patent Office 2,782,657
Patented Feb. 26, 1957

2,782,657

PRESSURE REGULATING SYSTEM FOR MOTOR VEHICLE TRANSMISSION CONTROLS

Carroll J. Lucia, Birmingham, Mich., assignor to Studebaker-Packard Corporation, Detroit, Mich., a corporation of Michigan Application March 31, 1955, Serial No. 498,405

11 Claims. (Cl. 74—645)

This invention relates to a pressure regulating system for hydraulically operated motor vehicle transmission, and more particularly, it relates to an interdependent related series of control valves in a hydraulic control system for motor vehicle transmissions, which regulate the fluid pressure utilized to activate the transmission brakes and clutches.

In a hydraulic control system for motor vehicle transmissions having low and high driving ranges, fluid pressure from a pressure reservoir is utilized to effect the engagement or disengagement of various hydraulically operated transmission brakes and clutches. In order to obtain a smooth transition between the different driving ranges and also to prevent undue wear on the brakes and clutches it is necessary to provide a regulating means to control the pressure in the reservoir, so that the desired pressure is available at all times to operate the transmission. Under conditions of relatively high engine torque, for example, as when the vehicle is driven at low speeds and with full throttle, the high range clutch is subjected to severe strains which may result in its premature failure unless a relatively high fluid pressure is provided to hold it firmly in engagement.

To this end, the applicant has developed a simple and dependable pressure control system for hydraulically operated vehicle transmission which includes two independently operated pumps to supply fluid under pressure to the reservoir and, a regulating valve means responsive to changes in vehicle speed and engine torque to selectively operate the pumps and to maintain the desired pressure in the reservoir.

For further understanding of the invention reference may be had to the accompanying drawings in which:

Figures 1 and 2 disclose a schematic view of a hydraulic control system for operating various brakes and clutches for a vehicle transmission.

Figure 3 is an enlarged view in section of the governor regulator valve shown in Figure 2;

Figure 4 is an enlarged sectional view of the throttle valve shown in Figure 2;

Figure 5 is an enlarged sectional view of the throttle limit valve shown in Figure 2;

Figure 6 is an enlarged sectional view of the direct shaft throttle valve shown in Figure 2;

Figure 7 is an enlarged sectional view of the manual selector valve shown in Figure 2;

Figure 8 is an enlarged sectional view of the reverse shuttle valve shown in Figure 2;

Figure 9A:
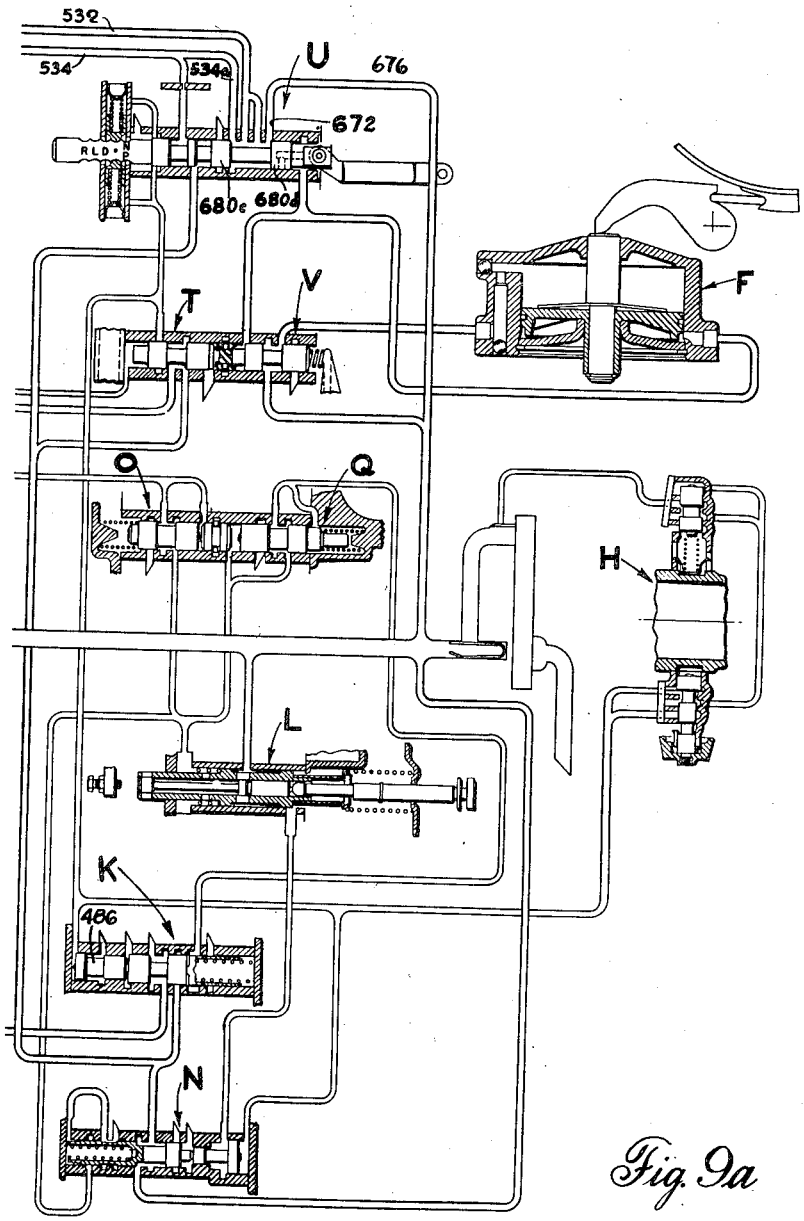
Figure 10A:
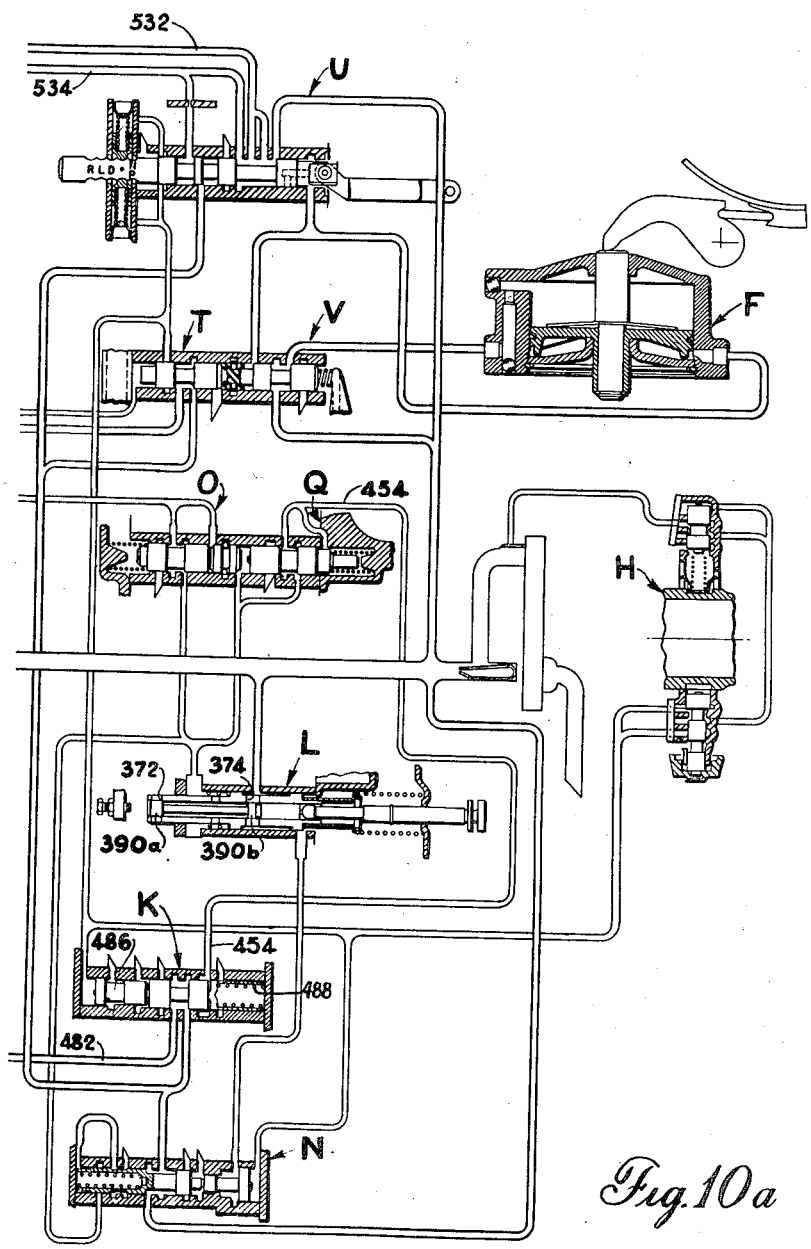
Figure 11:
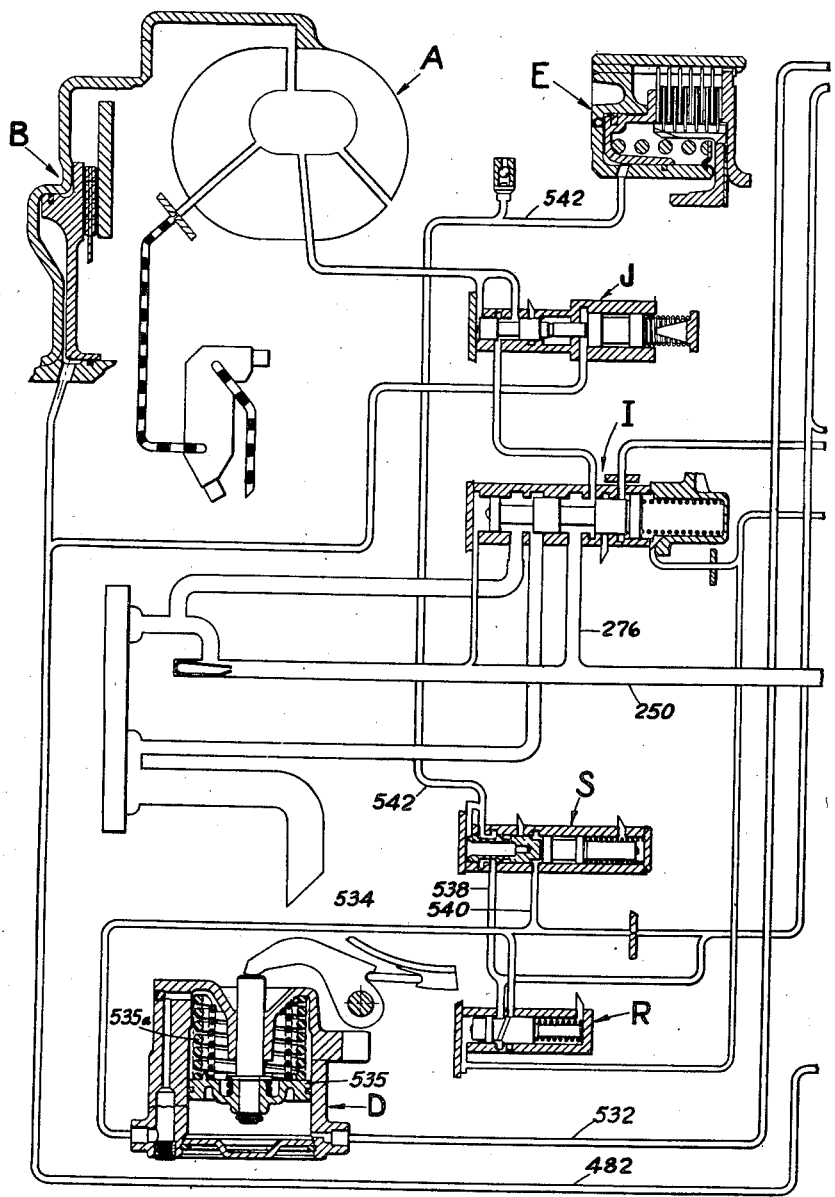
Figure 11A:
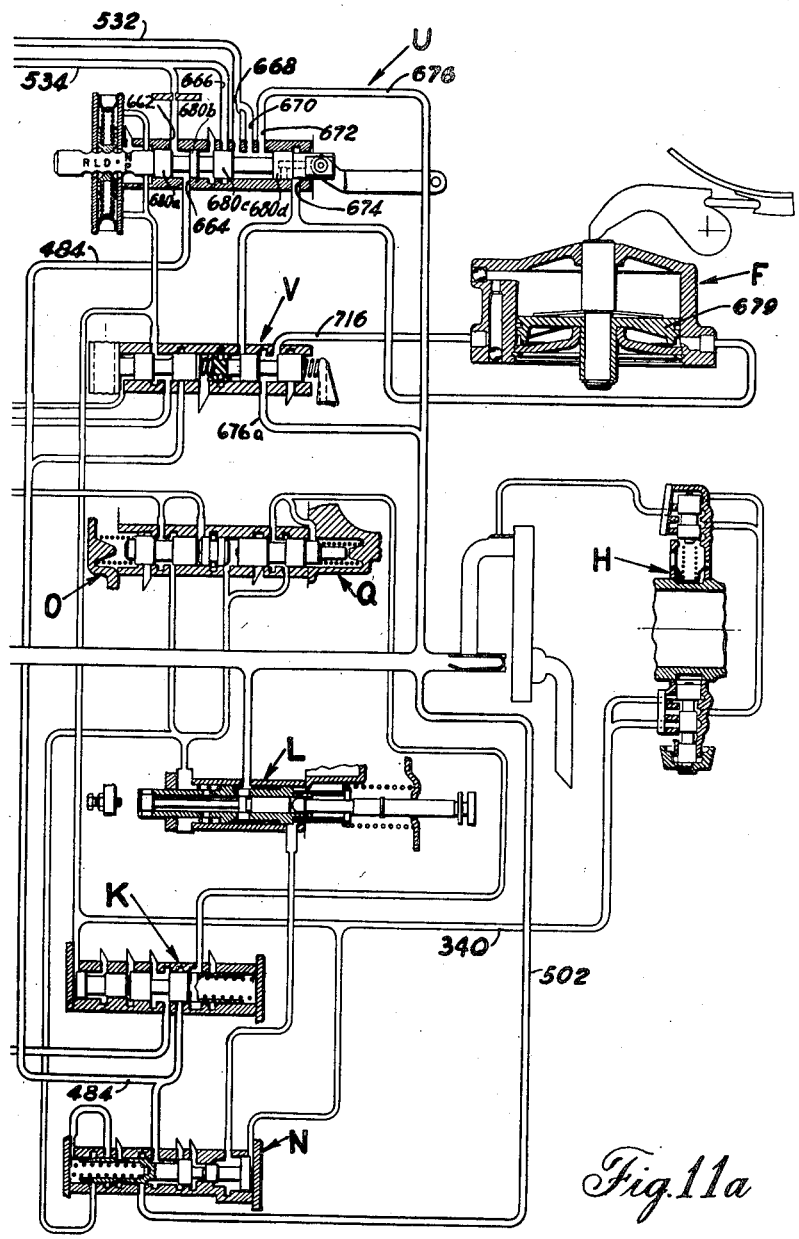
Figure 12A:
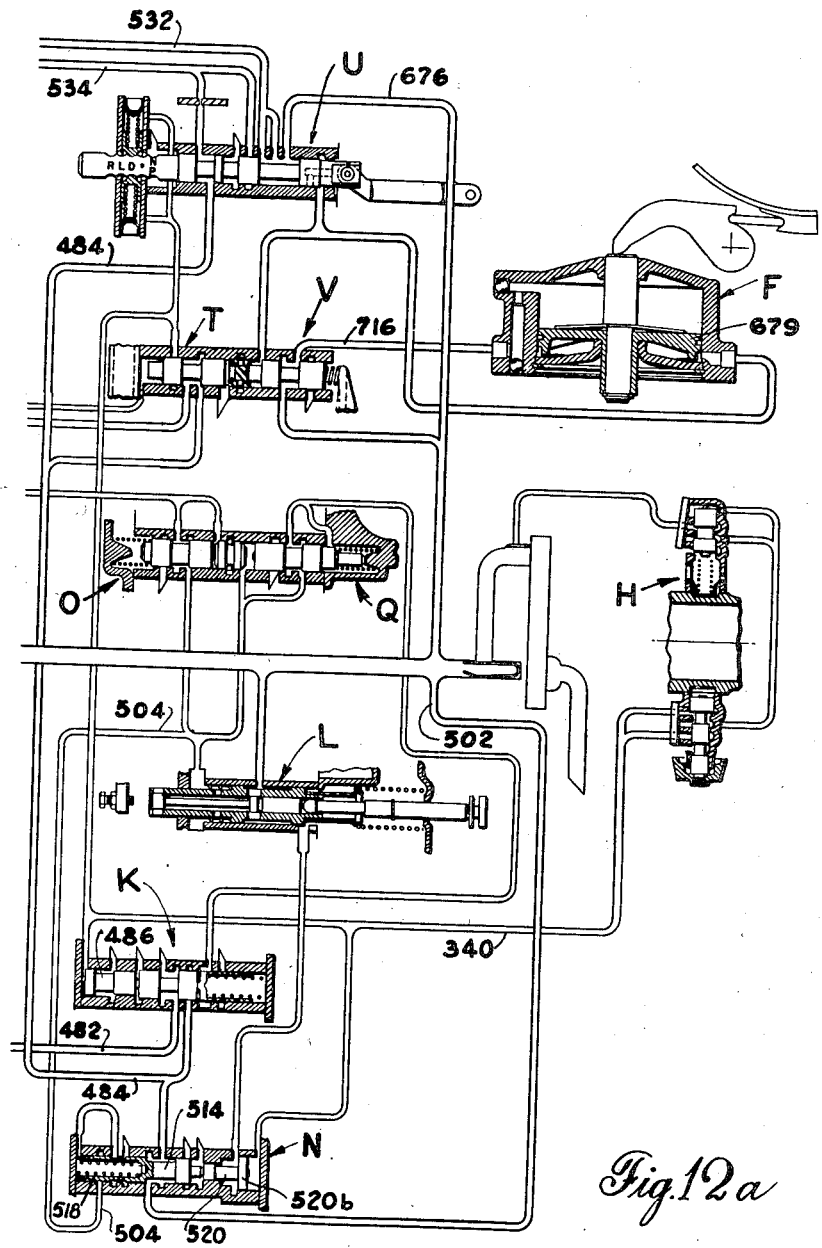
Figure 13A:
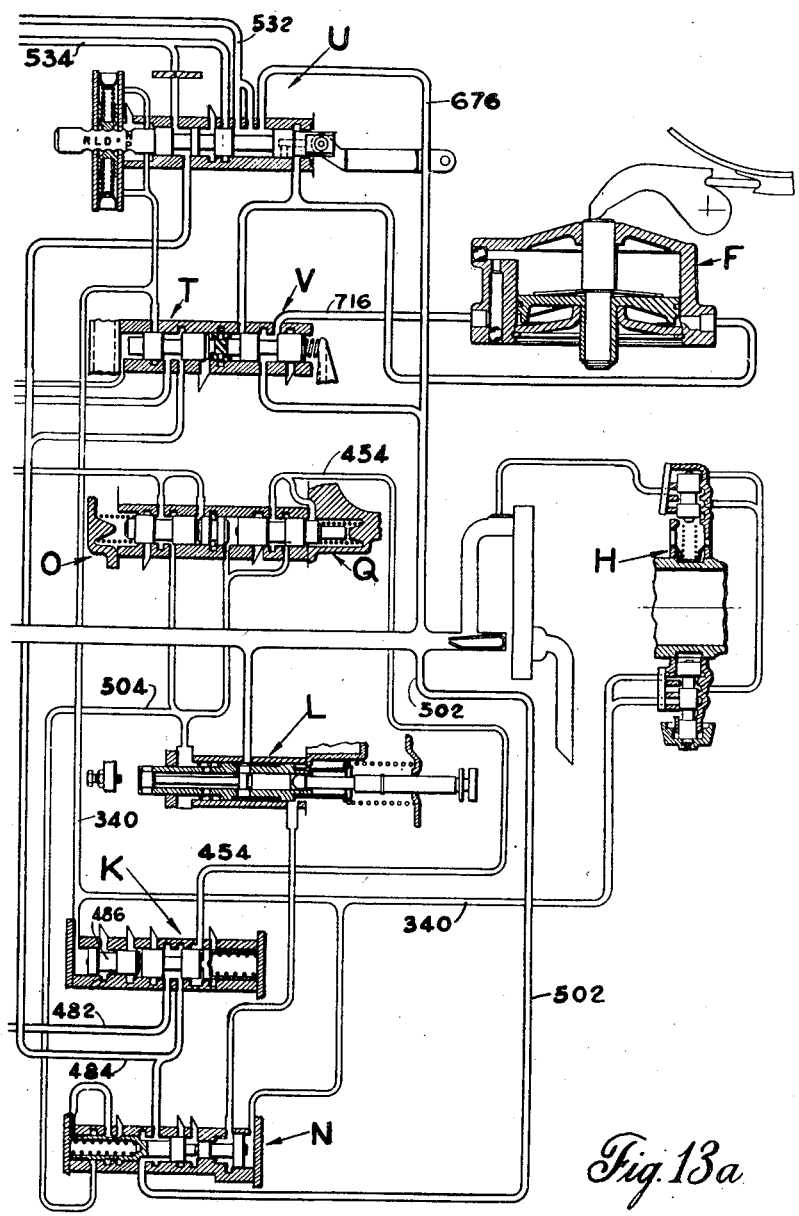
Figure 14A:
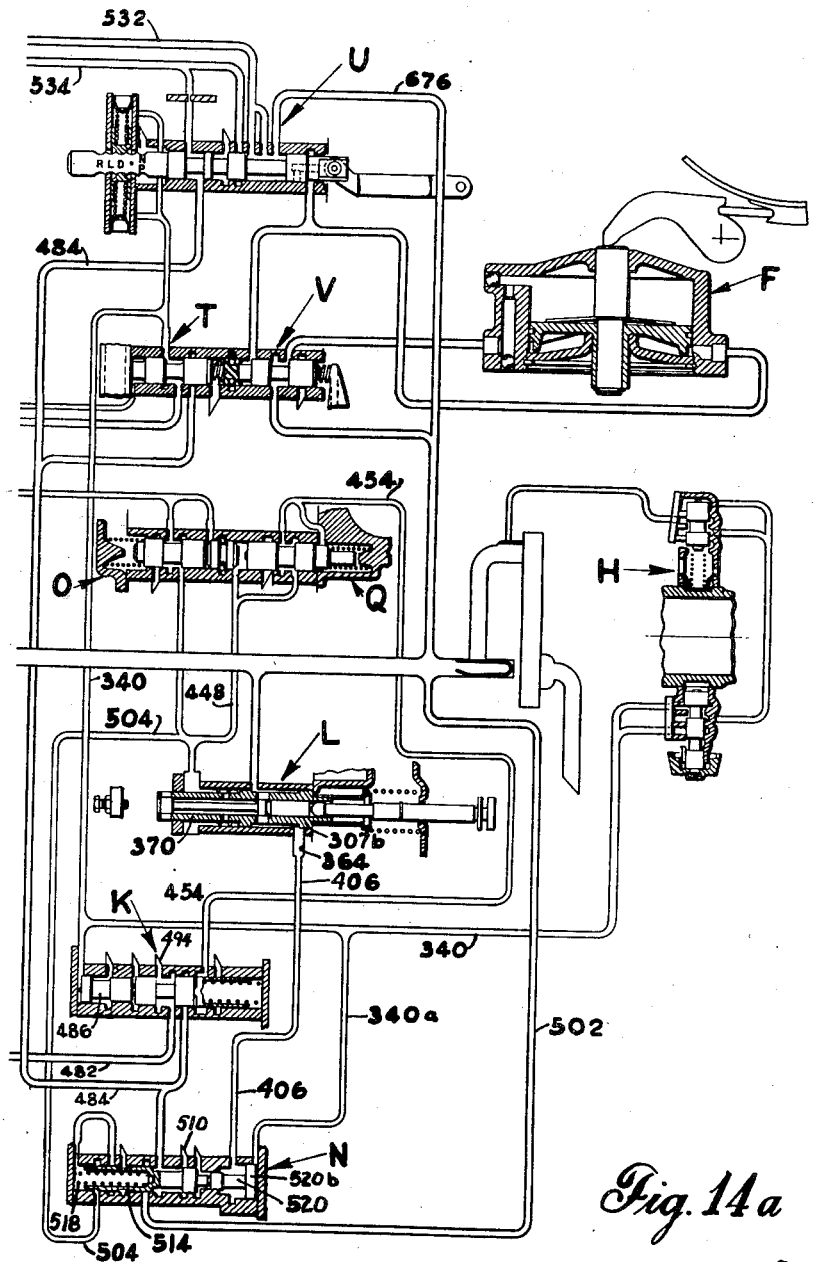
Figure 15:
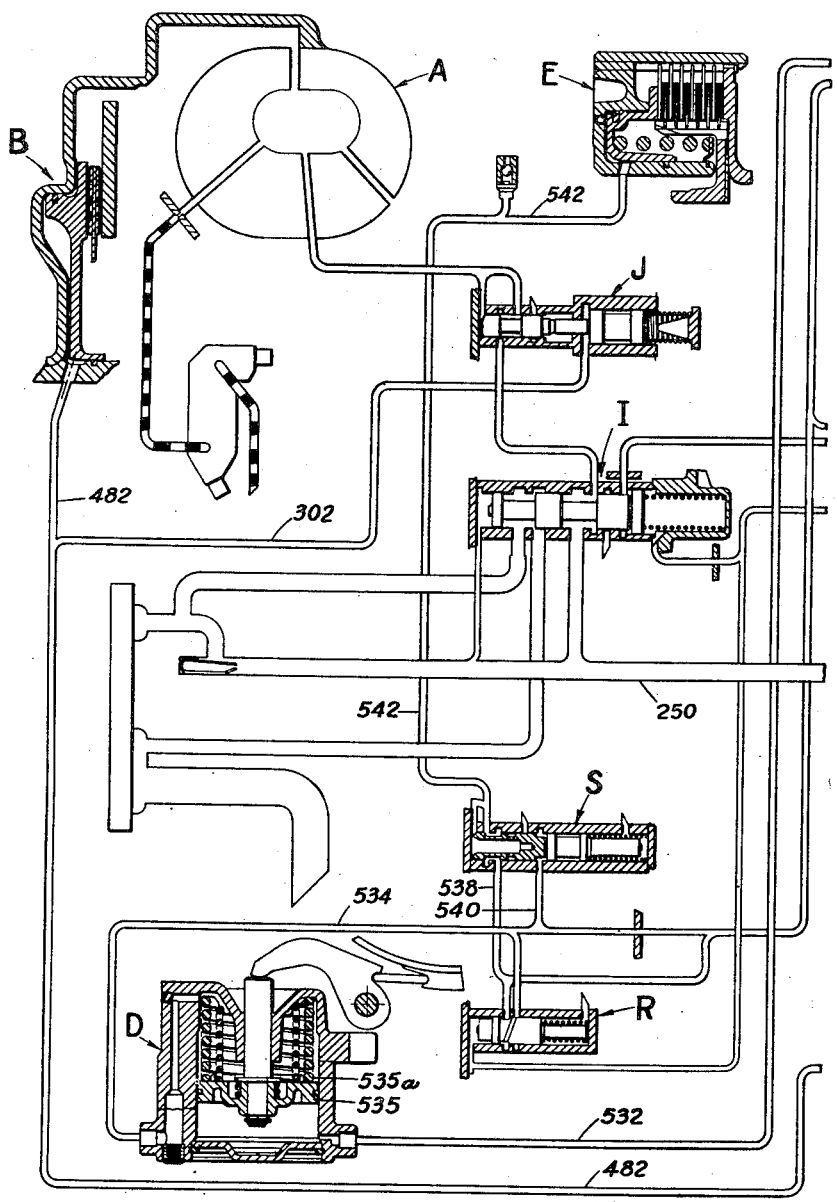
Figure 15A:
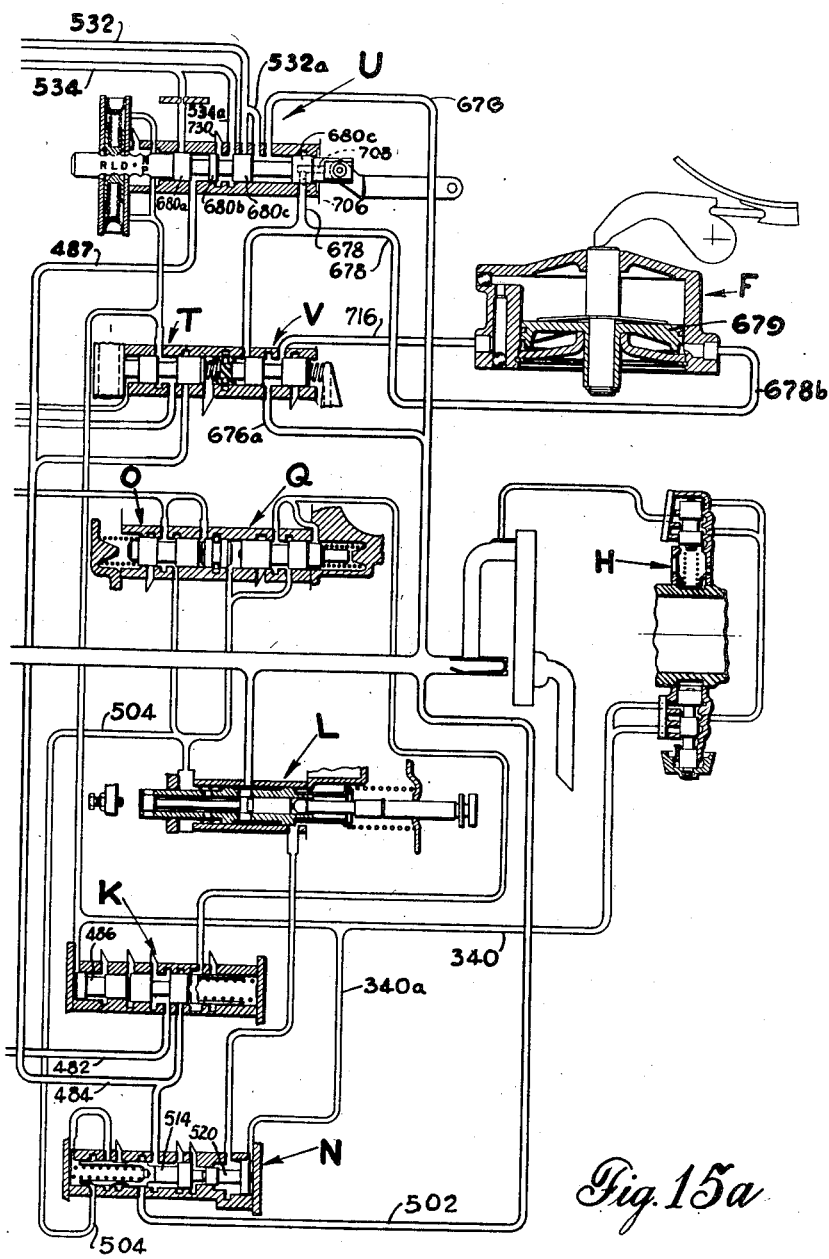
Figure 16:
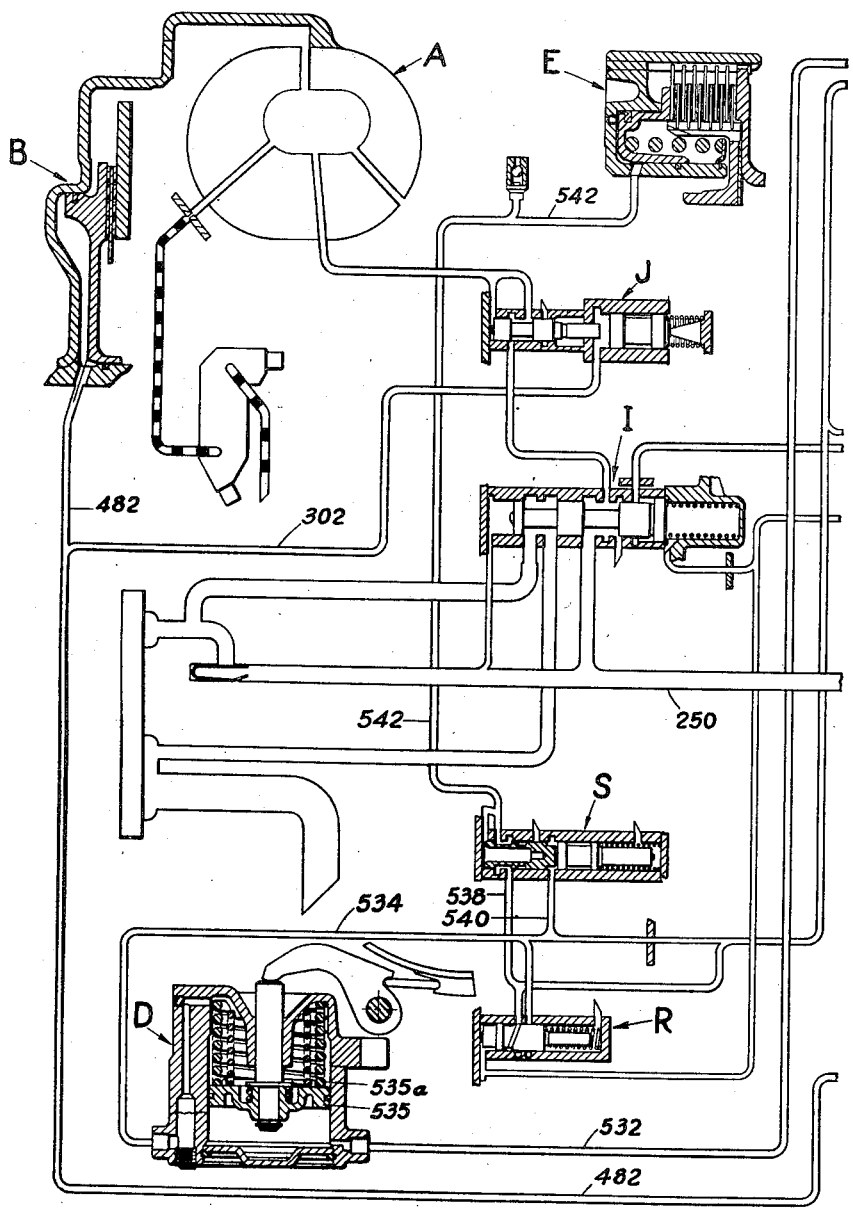
Figure 16A:
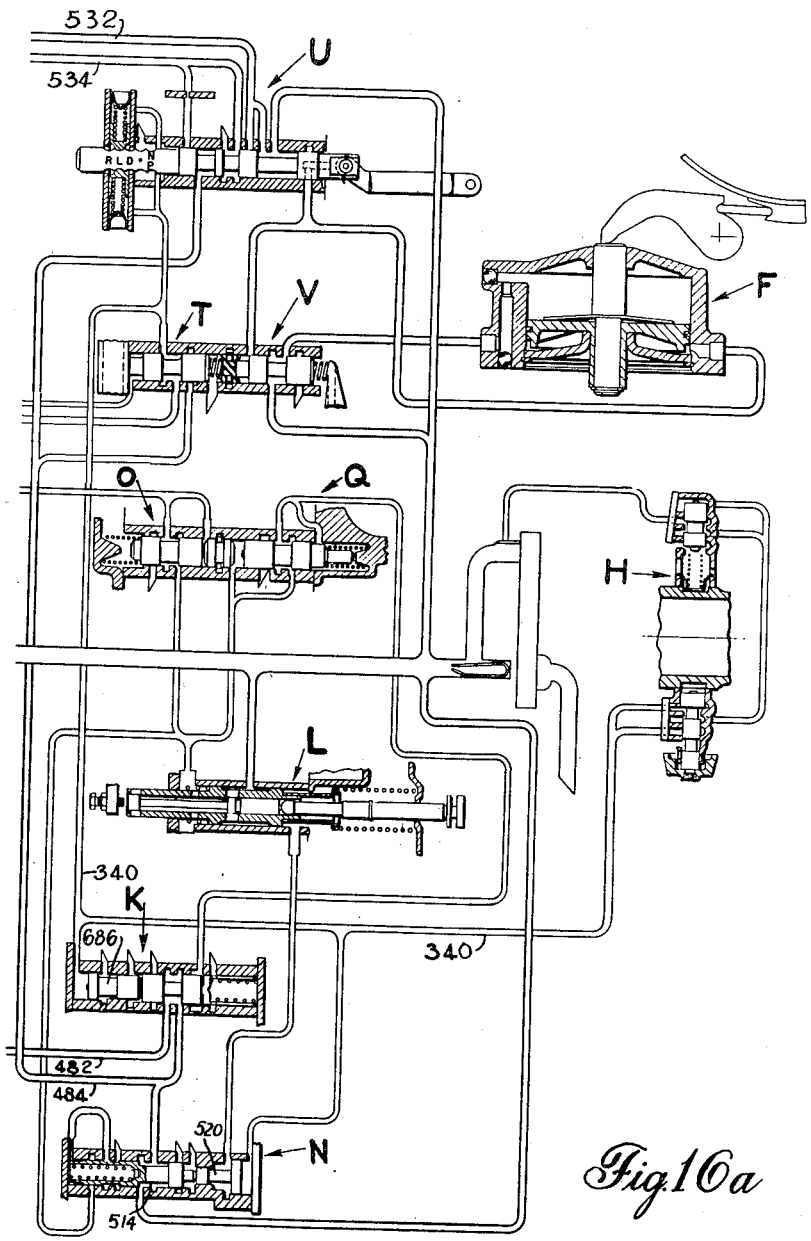
Figure 17A:
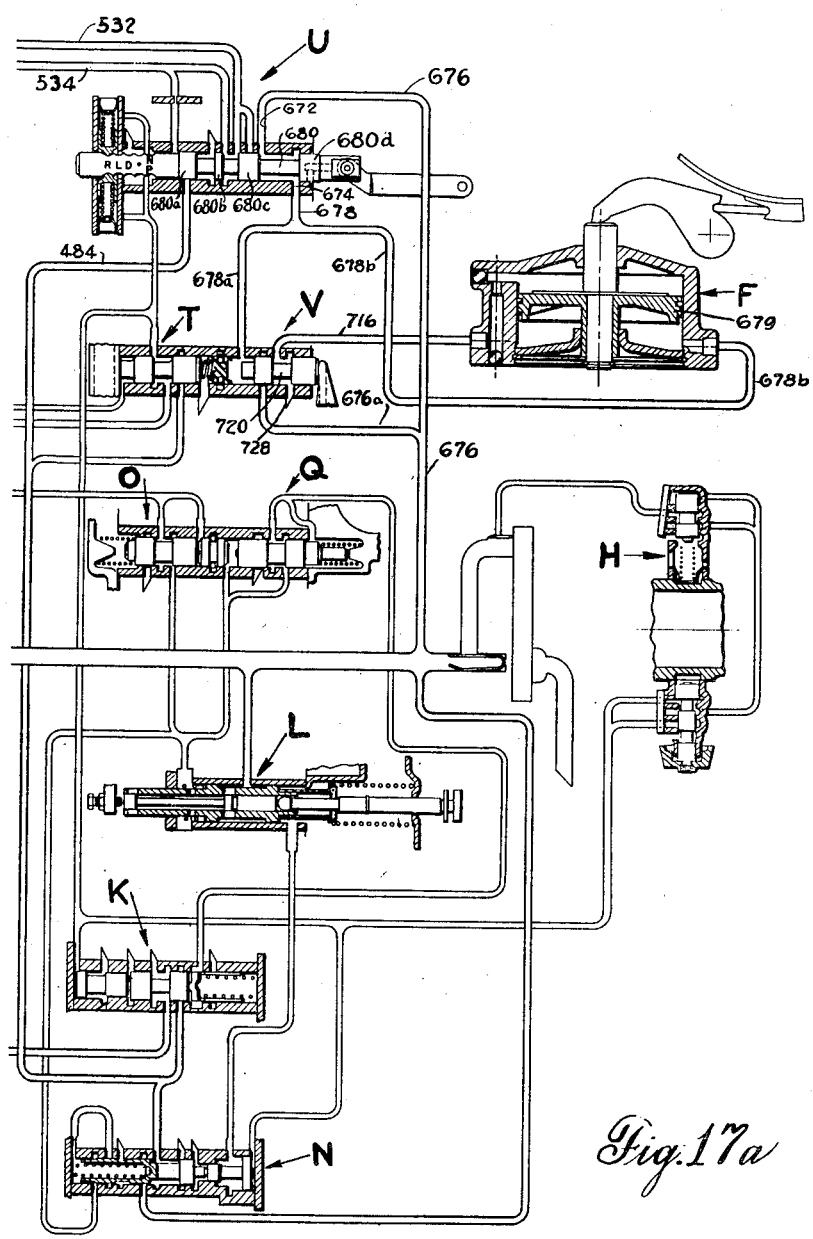

Figures 9 and 9a disclose a schematic view of the hydraulic control system conditioned to engage the high range converter drive with manual selevtor valve in the "." position;

Figures 10 and 10a disclose a schematic view of the control system conditioned to engage the high range direct drive with the manual selector valve in the "." position;

Figures 11 and 11a disclose a schematic view of the control system conditioned to engage the low range converter drive, with the manual selector valve in the "D" position;

Figures 12 and 12a disclose a schematic view of the control system conditioned to engage the high range converter drive with the manual selector valve in the "D" position;

Figures 13 and 13a disclose a schematic view of the control system conditioned to engage the high range direct drive, with the manual selector valve in the "D" position;

Figures 14 and 14a disclose a schematic view of the control system conditioned to effect a downshift (kickdown) from high range direct to low range converter drive;

Figures 15 and 15a disclose a schematic view of the control system conditioned to engage the low range converter drive, with the manual selector valve in the "L" position;

Figures 16 and 16a disclose a schematic view of the control system conditioned to engage the low range direct drive, with the manual selector valve in the "L" position;

Figures 17 and 17a disclose a schematic view of the control system conditioned to engage the reverse drive.

Figure 1:
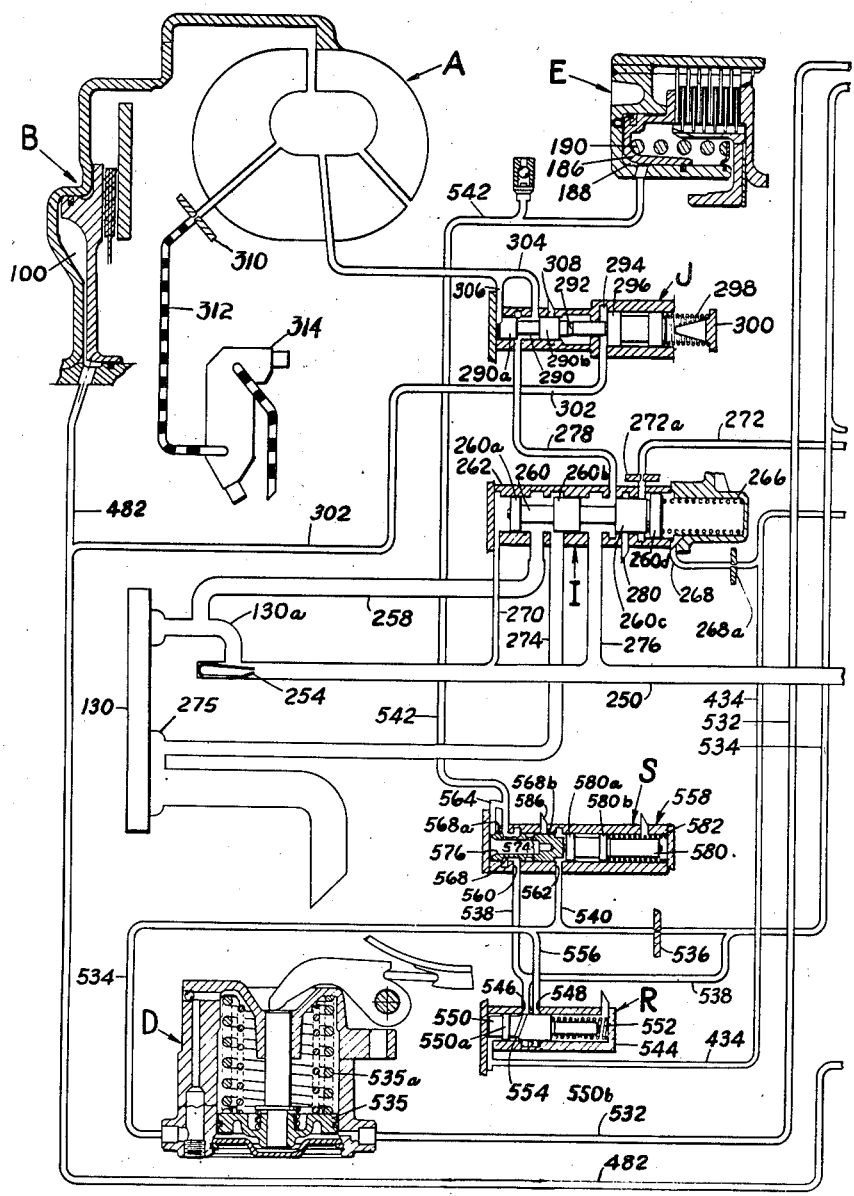
Figure 2:
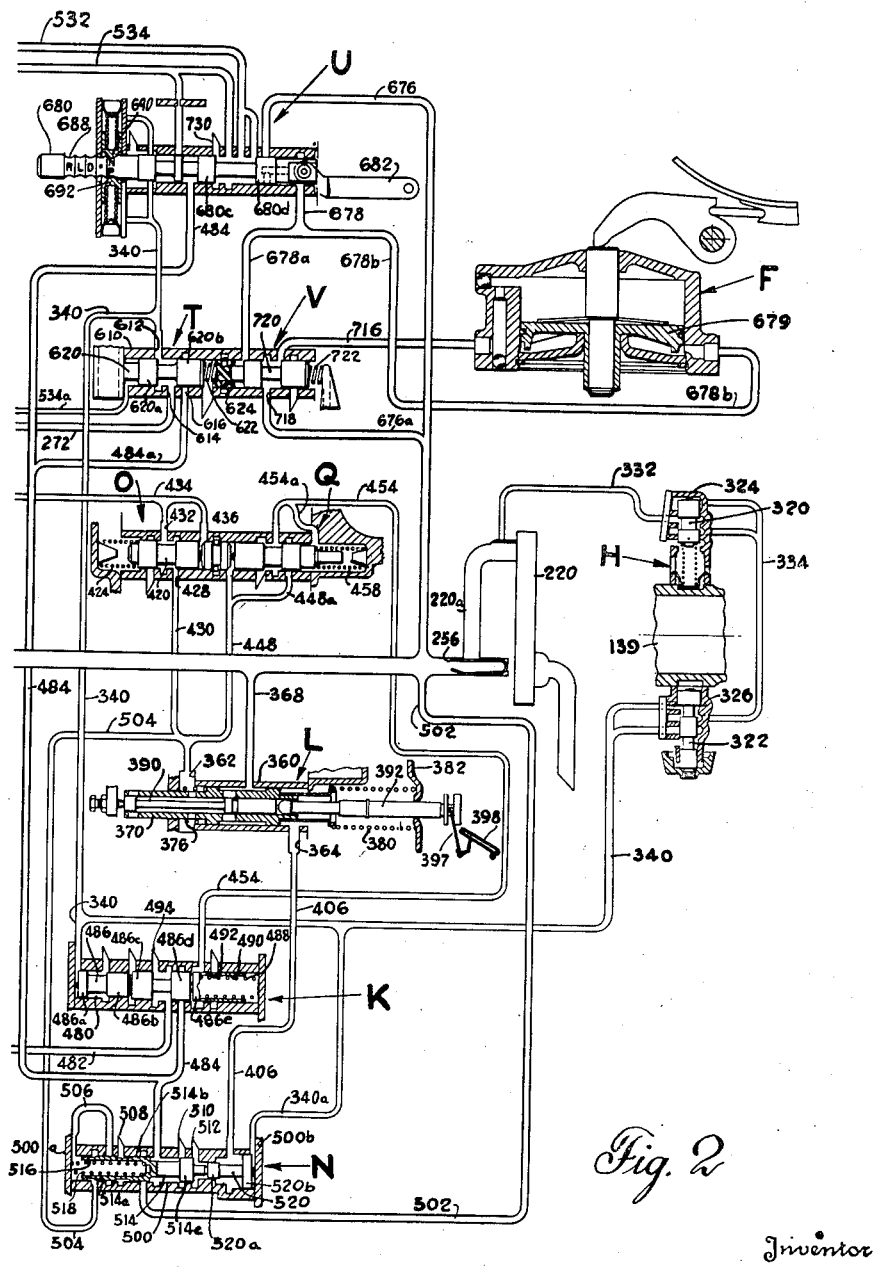

With reference to Figures 1 and 2 disclosing a diagrammatical view of the hydraulic control system which is similar to that disclosed in the copending application of Forest R. McFarland, Carroll J. Lucia and John Z. DeLorean Serial No. 498,404 dated March 31, 1955, it will be seen that the front and rear pumps 130 and 220 respectively, are connected by a fluid pressure gallery 250. The pumps draw fluid from a sump and circulate it through the hydraulically operated transmission controls, as well as the lubrication system of the transmission unit.

The front pump is drivingly connected with the engine drive shaft in the customary manner and is thus adapted to supply fluid under pressure to the gallery 250 whenever the vehicle engine is running. The rear pump 220 is driven by the output shaft of the engine in the conventional manner, and thus operates only when the output shaft is driven. Check valves 254 and 256 are disposed at opposite ends of the gallery adjacent the pump outlet conduits 130a and 220a connecting with the front and rear pumps, respectively. The check valves 254 and 256 are arranged so that as the speed of the car is increased to approximately 5 to 8 miles per hour, the rear pump output increases sufficiently to open the rear pump check valve 256 to admit pressure to the gallery and thereby close the front pump check valve 254. When the front pump is operating, the front pump output pressure is delivered from its outlet to a pump regulator valve I, through the connecting conduit 258.

The pump regulator valve I includes a valve 260 which is reciprocally mounted within a housing 262. The valve 260 has four lands 260a, 260b, 260c, 260d; the first three all being of equal diameter but smaller than the diameter of land 260d. The valve 260 is urged to the left by a spring 266 retained between the right hand end of the valve and the adjacent housing wall. The action of spring 266 is supplemented by a torque responsive throttle limit valve pressure admitted to the right hand end of housing 262 through conduit 268, and which exerts a force against the right side of valve land 260d. Gallery fluid pressure is delivered through conduit 270 to the left hand end of the housing and urges the valve 260 to the right against the action of the spring 266 and the throttle limit pressure. In addition, the movement of valve 260 to the right is assisted by the modulating valve fluid pressure delivered to the housing through conduit 272, which exerts a force against the left side of land 260d. Restricted orifices 268a and 272a are connected in series with conduits 268 and 272, respectively, to minimize the effect of surging of the fluid pressure therein on the valve operation.

When the front pump is operating and the gallery pressure exceeds a predetermined limit, the valve 260 is moved a sufficient distance to the right so that land 260d uncovers conduit 274 connecting with the intake 275 of the front pump 130, and fluid pressure from the conduit 258 is permitted to flow therethrough back to the front pump.

Gallery fluid pressure is also delivered to the pump regulator valve I through conduit 276, and under normal operating conditions is permitted to flow between lands 260b and 260c into conduit 278 which connects with the converter valve J. In the event the rear pump 220 builds up excessive gallery pressures, valve 260 is moved to its extreme right-hand position, and as a result, land 260c uncovers vent line 280 connecting with the sump 252, and the gallery pressure from conduit 276 is vented therethrough.

From the above description it will be appreciated that the pump regulator valve I controls the pressure of the gallery fluid, and also determines which of the two pumps, independently or in combination, are to be operatively connected to the control system. In addition, if there is a large demand of fluid pressure while the rear pump 220 is operating, the regulator valve will operatively connect the front pump 130 with the system. Also, it will be seen that the applicant's regulator valve and gallery arrangement insures that sufficient pressure is first delivered to the gallery to operate the transmission clutches and brakes, before pressure is admitted to the converter valve J.

The converter valve J serves the dual function of maintaining the desired high fluid pressure in the converter A when the lock-up clutch B is inoperative and the converter is rendered operative, and a fixed percentage lower fluid pressure in the converter when the converter lock-up clutch B is engaged. The converter valve includes a valve 290 with two lands 290a and 290b of equal diameter, and an elongated valve stem 292 which extends into a separately enclosed fluid pressure chamber 294 housing valve 296. A spring 298 interposed between a spring stop member 300 and the right hand end of valve 296, tends to hold the left side of valve 296 in contact with the right hand end of valve 290. When the direct shift valve K is opened the pressure of the fluid in chamber 294 moves the valve 296 to the right, against the action of spring 298. Also, the fluid pressure from conduit 302 exerts a force against the end of the valve stem 292, thereby tending to move valve 290 to the left, but with less force than when the spring 298 forces the valve 296 against stem 292 of valve 290. When the direct shift valve K is closed and no fluid pressure is delivered through conduit 302, valve 296 bears against valve stem 292, and spring 298 moves both valves 296 and 290 to the left.

As valve 290 is moved to the left, land 290a uncovers conduit 278 connecting with the pump regulator valve I, and fluid pressure is admitted between lands 290a and 290b, through conduit 304 to the converter A, and thence through a restricted orifice 310 in the converter outlet conduit 312 connecting with a cooler 314, which in turn connects with the sump. The fluid pressure contained in line 304 is also conducted to the left hand end of the valve 290 through connecting conduit 306, which tends to move the valve 290 to the right against the action of spring 298, thereby effecting a reduction in the fluid pressure delivered to the converter as land 290a meters the flow through conduit 278.

When gallery pressure is delivered to chamber 294 through conduit 302, the force exerted thereby against the right end of the valve stem 292, which is of smaller diameter than valve 296, permits valve 290 to move to the right so that land 290a meters a reduced pressure through conduit 278 to the converter A. By this arrangement a fixed percentage of lowed fluid pressure is admitted to the converter for lubrication and cooling purposes when the latter is inoperative and the converter lock-up clutch is engaged. Therefore, it will be seen that in the applicant's control system arrangement, the operative converter lock-up clutch pressure and the converter pressure are self compensating in the event of pressure leakage in the lock-up clutch, when the latter is engaged. If the pressure delivered to the converter exceeds a predetermined limit, valve 290 is moved a sufficient distance to the right so that land 290a covers conduit 278 and land 290 uncovers vent line 308, with the result that the pressure in conduit 304 is vented to the sump. Thereafter, spring 298 and the gallery fluid pressure if any, returns valve 290 to its normal metering position.

It will be appreciated that the desired percentage differential in fluid pressure delivered to the converter when the latter is activated or rendered inoperative, may be obtained by varying the differentials in the diameters of the valve stem 292 and valve 296. In addition, the maximum fluid pressure delivered to the converter through the conduit 304 may be controlled by varying the tension of spring 298.

A speed responsive fluid pressure as determined by the speed of the output shaft 139 delivered by the governor valve H is utilized in conjunction with the torque responsive fluid pressure as determined by the position of the accelerator pedal delivered by the throttle valve L to operate the various controls in the hydraulic system, which in turn operate the transmission brakes and clutches, in a manner subsequently to be described.

With specific reference to Figure 3, it will be seen that the governor valve H includes a lightweight high speed valve 320 and a heavier weighted low speed valve 322 which are reciprocably mounted in valve chambers 324 and 326, respectively. The valve chambers 324 and 326 are fixedly mounted on output shaft 139, and the centrifugal force generated by their rotation tends to move the valves 320 and 322 away from and at right angles to the axis of the shaft. The centrifugal force acting upon the high speed valve 320 is supplemented by a spring 328 retained within the housing 324 between the under side of the valve and a spring stop member 330 which bears against the output shaft.

Fluid pressure from the outlet conduit 330a of the rear pump 220 is delivered to the high speed valve chamber 324 through conduit 332. The spring 328 normally positions the valve 320 so that land 320a uncovers conduit 332, and thus the rear pump pressure is permitted to flow out of the valve chamber through conduit 334 to the low speed governor valve chamber 326. Pressure from conduit 334 is also delivered to the upper end of the high speed valve chamber 324 through connecting conduit 336, and tends to move valve 320 inwardly against the action of the spring 328 and the centrifugal force, if any. As a result, the flow of fluid pressure from conduit 332 is metered by the relative movement of valve land 320a in respect thereto. If the pressure in conduit 334 exceeds a predetermined maximum limit for any driving speed, valve 320 is moved inwardly a sufficient distance by the fluid pressure at its outer end so that land 320a covers conduit 332 and land 320b uncovers vent port 338, whereupon, fluid pressure from line 334 flows through vent port 338 communicating with the sump.

It will be appreciated that the fluid pressure in conduit 334 at least must be equal to the force exerted by spring 328 before the high speed valve 320 commences to regulate the governor output pressure. It will also be appreciated that the relatively light weight high speed governor valve is adapted to provide a more sensitive pressure regulation at high vehicle speeds than would be possible using only a heavier weighted low speed valve, next to be described.

The low speed valve 322 has three lands; lands 322a and 322b, which are disposed near its outer end and center portion, respectively, being of equal but smaller diameter than land 322c disposed adjacent the output shaft 139. When the output shaft 139 is rotated, valve 322 is moved outwardly by centrifugal force and land 322b uncovers conduit 334 whereupon fluid pressure is permitted to flow between lands 322b and 322c to the governor outlet conduit 340. At the same time, the fluid pressure in chamber 326 tends to move valve 322 inwardly, due to the larger diameter of land 322c, and as a result, land 322b meters the pressure flow from conduit 334. It will be appreciated that the low speed valve 322 is adapted to provide a relatively steep increase in governor output pressure, due to its heavier weight and the different area of lands 322b and 322c.

If the pressure in conduit 340 exceeds a predetermined limit, valve 322 is moved inwardly a sufficient distance so that land 322b covers conduit 334. Land 322b also uncovers a port 342 communicating with the outlet conduit 340 through connecting conduit 344. Thus, fluid pressure is permitted to flow through port 342 to a vent port 346 until the pressure in conduit 340 is sufficiently reduced and valve 322 is returned to its normal metering position.

With specific reference to Figure 4, it will be seen that the throttle valve L includes a cylindrical housing 360 with pressure outlet ports 362 and 364 near its opposite ends, and with a centrally disposed pressure inlet port 366 connected with gallery 250 by conduit 368. A sleeve shaped piston 370 having lands 370a and 370b of equal diameter formed near its center and right hand end, respectively, is not reciprocably mounted within the housing 360. The piston 370 has a radial vent port 372 near its left hand end, and a radial pressure port 374 near its center. A throttle idle spring 376 disposed about the left end of piston 370, is loosely retained between the left side of land 370a and the adjacent housing end wall 378. It will be noted that spring 376 acts to move the piston 370 to the right, only when the piston is moved sufficiently to the left that spring 376 bears against the housing wall 378. The piston 370 is urged to the left by spring 380 disposed at its opposite end. The spring 380 is retained between the right hand housing end wall 382 and a cylindrically shaped spring retainer 384, which fits about the right end of piston 370 and abuts land 370b.

A valve 390 having lands 390a, 390b, and 390c, is slidably mounted within the piston 370, in axial alignment therewith. A plunger 392 is mounted for reciprocal movement through an opening 394 in the housing end wall 382 and extends through the cylindrical spring retainer 384. The left end of the plunger 392 is received within the piston 370 and is connected to the right end of valve 390 by a ball and socket coupling 396. The opposite end of the plunger 392 is connected by suitable linkage 397 to an engine accelerator pedal 398, as shown diagrammatically in Figure 2a. Thus, the position of the plunger 392 and valve 390 relative to the piston 370, is dependent upon the engine throttle setting. The leftward movement of the piston 370 and valve 390 towards the full closed throttle position is limited by an adjustable stop member 399.

When the plunger 392 and valve 390 are moved toward the full closed throttle position, spring 380 moves piston 370 sufficiently to the left so that the throttle idle spring 376 bears against the housing wall 378. As a result, piston 370 is positioned so that the right hand land 370b closes the outlet port 364 and, the left hand land 390a of valve 390 partially opens the piston vent port 372, and land 390b opens port 374. Under these conditions, the gallery pressure from conduit 368 is permitted to flow into a passageway 400 formed between piston 370 and valve 390. A portion of the fluid pressure in passageway 400 flows through vent port 372 to the sump, and the remainder flows through port 402 in the piston, and thence to the housing outlet port 362. The pressure delivered to the outlet port 362 exerts a force against the left side of land 370a urging the piston to the right, and port 374 is thereby partially closed by valve land 390b.

When the valve 390 is moved, a relatively small distance toward the open throttle position, spring 376 no longer bears against the housing wall 378, and thus the fluid pressure at the outlet port 362 alone acts to move the piston 370 to the right against the action of spring 380. As a result, a reduced pressure flow is metered through port 374. It will be appreciated that throttle valve outlet pressure remains approximately in direct proportion to the speed increasing position of the accelerator pedal, and is therefore substantially proportional to the torque output of the engine. In this connection, it will be seen that throttle idle spring 376 is utilized to position the piston 370 such as to provide a rapid increase in the throttle valve pressure as the engine throttle is initially opened and a corresponding rapid increase in engine torque is developed. A high throttle pressure is required under these operating conditions to ensure the positive engagement of the transmission brakes and clutches.

When the valve and plunger are moved beyond the full throttle setting to the kickdown position, valve land 390a closes vent port 372, and the full gallery pressure delivered to the outlet port 362, moves the piston 370 to its extreme right hand position against stop 404. As a result, land 370b uncovers outlet port 364, and gallery pressure flows therethrough, into conduit 406 connecting with the low-high shift valve N.

In the event the driver quickly removes his foot from the accelerator pedal and the valve 390 is moved rapidly to the left, valve land 390a is moved momentarily beyond the piston, uncovering vent port 372. Thus, spring 380, unopposed by the gallery fluid pressure, rapidly returns piston 370 towards the closed throttle position.

The throttle limit valve O as shown in Figure 5, includes a valve 420 with lands 420a and 420b disposed near its opposite ends, which is mounted for reciprocal movement within a cylindrical housing 422. A spring 424 retained between the left hand end of the valve 420 and the adjacent housing end wall, tends to move the valve to the right, towards a valve stop member 426. When valve 420 bears against stop 426, an inlet port 428 communicating with a throttle valve pressure conduit 430 is uncovered by the right hand land 420b. The throttle valve pressure is then permitted to flow around the valve to an outlet port 432 which is connected with the low regulator valve R by conduit 434. Also, as previously described, fluid pressure is delivered to the right hand end of the pump regulator valve J, through connecting conduit 268. In addition, pressure from conduit 434 is delivered by branch conduit 434a to a port 436 at the right hand end of housing 422, which urges valve 420 to the left against the action of spring 424 and land 420b thereby meters the pressure flow through the action of spring 424 and grooved portion of valve 420 thereby meters the pressure flow through the inlet port 428.

It will be appreciated that the maximum pressure which is permitted to flow through the throttle limit valve O cannot exceed the force exerted by spring 424, and the maximum outlet pressure may be determined by varying the tension of the spring. In the event of a sudden surge of pressure in conduit 434 and branch conduit 434a, valve 420 is moved to the left a sufficient distance so that its left hand land 420a uncovers vent port 438 connecting with the sump, and the right hand land 420b covers inlet port 428. When the excessive fluid pressure in line 434 has been vented through port 438, spring 424 returns valve 420 to its normal metering position.

The direct shift throttle valve Q, as shown in Figure 6, includes a cylindrical chamber or housing 440 with valve stop members 442 and 444 disposed at opposite ends thereof. The housing 440 has a radially extending pressure inlet port 446 formed at its left hand end connecting with a throttle valve pressure conduit 448 which in turn connects with the throttle valve outlet port 362. Another radial inlet pressure port 450 is disposed in the side of the valve housing near its center which is connected by branch line 448a with conduit 448. An outlet pressure port 452 also formed in the side of the valve housing near its center, connects with conduit 454 communicating with the direct shift valve K.

A valve 456 having land 456a and 456b formed in its left hand end and near its center, respectively, is reciprocably mounted within the chamber 440. A spring 458 retained between the right hand end of the valve 456 and the adjacent housing end wall, urges the valve 456 towards the stop member 442.

As the throttle pressure enters the valve chamber through inlet port 446, the valve 456 is moved to the right against the force exerted by the spring 458, and land 456b uncovers inlet port 450 and thus throttle pressure is permitted to flow between the valve lands, through the outlet port 452 and into conduit 454. The fluid pressure in conduit 454 is delivered to the right side of land 456b by a branch conduit 454a connecting with a radial port 460 near the right end of the housing. The pressure in conduit 454 and 454a, therefore, assists spring 458 to move the valve 456 to the left, and land 456b meters the pressure flow through inlet port 450. If a surge of pressure occurs in line 454 the valve is moved momentarily to the left against stop 442, and land 456b closes the inlet port 450 and land 456a uncovers vent port 462. The excess pressure in line 454 is then vented through the vent port 462 to the sump until the valve is returned to its normal metering position.

From the above description, it will be apparent that the purpose of the direct shift throttle valve Q is to deliver a pressure which is a predetermined fixed amount less than the throttle valve pressure and this differential in pressure is determined by the tension of spring 458. If for example, spring 458 has an applied force equivalent to 35 pounds per square inch, the throttle valve pressure delivered through conduit 448 must equal approximately 35 pounds per square inch before the valve is opened and fluid pressure is permitted to flow into conduit 454. Thereafter, the pressure in conduit 454 remains approximately 35 lbs. less than the throttle valve pressure as the latter is increased.

As will be seen in Figures 2 and 2a, conduit 454 from the direct shift throttle valve Q, communicates with the right hand portion of a cylindrical housing 480 of the direct shift valve K. The governor pressure conduit 340 connects with the left hand end of the housing 480, and conduits 482 and 484 communicate with the interior of its center portion. Conduit 482 is connected with the converter lock-up clutch B, and conduit 484 connects with both the manual selector valve U and the low-high shift valve N.

A valve 486 is mounted for reciprocal movement within housing 480 and is normally held in engagement with the left hand housing end wall by a spring 488 retained between the right hand end of the valve 486 and the adjacent housing end wall. The valve has five lands; lands 486a and 486b near its left hand end being of equal diameter, and lands 486c, 486d, 486e near its center and right hand end, respectively, being of equal diameter and larger diameter than lands 486a and 486b. For the reasons of economy and convenience of manufacturing, the valve 486 may be formed by two or more separate valves disposed in axial alignment.

When the engine is idling, spring 488 is assisted in moving valve 486 to the left by the direct shift throttle pressure from conduit 454 (a fixed amount less than the throttle pressure with a minimum of 35 p. s. i.). The direct shift throttle pressure is admitted into the interior of an axial bore 490 in the right end of the valve through a connecting radial bore 492, and reacts against the right side of valve land 486e. With the valve in its left hand position, land 486d covers conduit 484 communicating with the low-high shift valve N, and conduit 482 connecting with the converter lock-up clutch B is vented to the sump through vent port 494 which is uncovered by land 486c. When the governor pressure has increased sufficiently to move valve 486 to its right hand position within housing 480, land 486c covers vent port 494 and land 486d uncovers conduit 484. Thus, the low-high shift valve pressure from conduit 484 is permitted to flow between lands 486c and 486d to conduit 482, and thence to pressure chamber 100 in the converter lock-up clutch B. In addition, pressure from conduit 482 flows through branch line 302 to the converter valve J, which as previously explained meters a reduced pressure flow to the converter A while the lock-up clutch B is engaged.

When the vehicle speed is decreased, and the governor pressure is correspondingly decreased, the throttle pressure and spring 488 move the valve 486 to its left hand position, and the pressure in the lock-up clutch conduit 482 is vented to the sump. From the above description it will be apparent, that the direct shift valve K serves to control the engagement of the converter lock-up clutch B when the vehicle has attained a predetermined driving speed.

The following paragraphs include a description of the low high shift valve N, the low regulator valve R, the shift regulator valve S and the modulating valve T, and a detailed explanation of their interrelated operation.

The low high shift valve N includes a cylindrical housing 500 the right hand end of which connects with a branch conduit 340a of the governor pressure conduit 340. The kick-down throttle valve pressure conduit 406 connects with housing 500 near its right hand end, the direct shift valve conduit 484 and a conduit 502 communicating with the gallery 250 are both connected with the middle portion of the housing. Also, a conduit 504 is connected near its left hand end, which communicates with the outlet port 362 of the throttle valve L. A by-pass line 506 connects with the left hand end and center portion of the housing interior on opposite sides of conduit 504. In addition, the housing 500 has a radial vent port 508 near its center, and vent ports 510 and 512 disposed near its right hand end between conduits 484 and 406.

A piston 514 having an axial bore 516 in its left hand end, is reciprocally mounted within the left hand end of the housing 500. The piston 514 has lands 514a, 514b and 514c at its left end, center and right end, respectively; lands 514a and 514b being of equal and slightly larger diameter than land 514c. A spring 518 seated within the piston bore 516 and retained against the left hand housing end wall 500a, urges the piston 514 to the right.

A valve 520 is reciprocably mounted in the right hand end of the housing 500, and is disposed in axial alignment with piston 514. The valve 520 has a land 520a at its left hand end and a land 520b of larger diameter at its right hand end. Governor pressure delivered to the right end of the housing 500 exerts a force against the right side of land 520b, thereby moving valve 520 to the left, into engagement with the right end of piston 514.

As shown in Figures 2 and 2a, when the engine is idling and the manual selector valve U is placed in its neutral position, the piston 514 and valve 520 are moved by spring 518 to the right against the right hand housing end wall 500b. Under these conditions, piston land 514 uncovers throttle pressure conduit 504 and covers the right end of the by-pass conduit 506. The throttle pressure from conduit 504 upon being admitted to bore 516, assists the spring 518 in maintaining the piston in its right hand position so that land 514b covers the gallery pressure conduit 502, and vent ports 508, 510 and 512 are opened. As a result, no pressure can flow through conduit 484 to the direct shift valve K and the manual selector valve U, and for reasons that will subsequently be described, neither the low brake D or the high clutch E are engaged.

When the vehicle commences to move, and the governor pressure in branch conduit 340a is proportionally increased, the valve 520 and piston 514 are at first slowly moved toward the left. Thus, piston land 514b partially uncovers conduit 502, and fluid pressure is permitted to flow between lands 514b and 514c into conduit 484. It will be apparent that a metering action momentarily occurs between land 514b and conduit 502 when a balance is attained between the governor pressure at the right side, and the spring and throttle pressure on the left side, of the valve. It will also be noted that when the low high shift valve N closes gallery conduit 502, no pressure can flow to the converter lock-up clutch B through conduit 482 regardless of the position of the direct shift valve K. A more complete description of the combined operation of the direct shift and the low-high shift valves will subsequently be given.

As the governor pressure increases, the piston 514 is moved further to the left, and land 514a covers the throttle pressure conduit 504, and the fluid pressure in bore 516 is vented through by-pass line 506 to vent port 508 connecting with the sump. As a result, the piston is moved rapidly to its extreme left hand position against the left hand housing end wall 500a since spring 518, alone, opposes its movement in this direction. Full gallery pressure is then permitted to flow through conduit 484, and the high range clutch E is engaged depending upon the position of the manual selector valve, which will subsequently be described in detail. In this connection, the governor pressure is assisted in holding the piston 514 in its extreme left hand position, by the force of the gallery pressure reacting against the right side of land 514b; the latter being of larger diameter than land 514c.

In the event the kick down throttle pressure is admitted to conduit 406 by the throttle valve L (when the accelerator pedal is depressed beyond its full throttle position), this pressure reacts against the left side of land 520b of valve 520, and the latter is moved to the right, if the governor pressure does not then exceed a predetermined limit. Consequently, the spring 518, then being unopposed by the governor pressure, moves the piston 516 rapidly to the right. The gallery pressure conduit 502 is then covered by land 514b, and no fluid pressure can flow through conduit 484 to the direct shift valve K. Therefore, regardless of the position of the latter, no pressure can be delivered through conduit 482 to engage the converter lock-up clutch B and consequently the converter A is activated. Also, since no pressure is delivered through conduit 484 to the manual selector valve U (and thence to the high range clutch and the release side of the low range brake D), the high range clutch may be inactivated and the low range brake engaged depending upon the position of the manual selector valve. A detailed description of the kickdown operation will be given following the description of the manual selector valve and its interrelated operation.

When the vehicle speed decreases, and a corresponding lower governor pressure is delivered to the right side of the valve, the piston 514 is at first moved slowly to the right by the action of the spring 518, thereby reducing the pressure flow to conduit 484. As the governor pressure decreases further, the piston is moved sufficiently towards the right that land 514a uncovers the throttle pressure conduit. Fluid pressure is then admitted to the piston bore 516 and the piston is rapidly moved thereby, to its extreme right-hand position, in engagement with the right hand housing end wall 500b.

It will be apparent upon reading the subsequent paragraphs, the lag preceding a positive, rapid movement of the piston 514, ensures that the operative transmission brake or clutch is released before the other is engaged.

The fluid pressure admitted to conduit 484 by the low-high shift valve N is conducted to the manual shift valve U. From there it flows through conduit 534 to the upper side of piston 535 in the low range brake D to effect its release. A restricted orifice 536 is connected in series with conduit 534 and serves to retard the fluid pressure flow to the release side of the low range brake D, for reasons subsequently to be described. The fluid pressure in conduit 534 is also conducted to the lower regulator valve R and the shift regulator valve S, by branch conduits 538 and 540, respectively. Pressure flows from the shift regulator valve S through conduit 542 to the piston chamber 188 in the high range clutch E, thereby effecting the engagement of the high range planetary gear system.

The low regulator valve R has a cylindrical shaped housing 544 with two closely spaced radial ports 546 and 548 in its side. A valve 550 having lands 550a and 550b near its left hand end and center portion, respectively, is reciprocably mounted within the housing. The valve 550 is urged to the left by a spring 552, which is loosely disposed about its right hand end and retained between the right side of land 550b and the right hand housing end wall. Throttle limit valve pressure is delivered by conduit 434 to the left hand end of housing 544, and exerts a force against the left side of land 550a, thereby tending to move the valve to the right against the action of spring 552.

A fluid passageway 554 extends through the middle portion of valve 550 at an oblique angle to its longitudinal axis. When the valve is moved to the right into engagement with right end of the housing 544, the opposite ends of passageway 554 communicate with ports 546 and 548, respectively. The tension of spring 552 is such that when the pressure delivered to the left hand end of valve 550 is approximately 10% of the maximum throttle limit pressure, the valve is moved to its right hand position. Under these conditions, the fluid pressure in conduit 534 may by-pass orifice 536, by flowing through branch conduit 538 and valve passageway 554 to port 548, and thence through conduit 556 which connects with conduit 534 at a point between the low range brake D and the orifice 536.

Thus, it will be apparent that above 10% of the maximum throttle limit pressure, orifice 536 is by-passed, and the full pressure in conduit 534 is utilized to effect the rapid engagement or release of the low range brake D. When less than 10% of the maximum throttle limit pressure is developed, the low regulator valve R is closed and the pressure flow through conduit 534 is retarded by orifice 536, and consequently, the engagement or release of the low range brake D is momentarily delayed. It will be appreciated that under conditions of low throttle pressure, and a corresponding low engine torque, the slower release of the low brake will result in a smooth transition from the low to the high range through the planetary gear system. At higher engine torque, however, a similar delay in the release of the low brake, would result in the premature failure of the high range clutch.

As shown in Figure 2, the shift regulator valve S includes a cylindrical housing 558 having radially disposed pressure inlet ports 560 and 562 near its center which connect with the by-pass lines 538 and branch conduit 540, respectively. The high clutch pressure conduit 542 is connected near the left hand end of the housing 558, and a branch conduit 564 connecting therewith, delivers fluid pressure to the left end of the housing interior. It will be noted that the pressure supplied through branch conduit 540 is momentarily of lower pressure than that delivered through conduit 538, because the latter by-passes the restricted orifice 536.

A piston 568 having lands 568a and 568b near it opposite ends is reciprocably mounted within the left hand end of housing 558. The piston 568 has radial ports 574 in its side which communicate with an axial bore 576 extending inwardly from the left end of the piston. A valve 580 with lands 580a and 580b near its left end and center portion, respectively, is reciprocably mounted in the right end of the housing 558 in axial alignment with the piston. A spring 582 is loosely disposed about the right end of valve 580 and is retained between the left side of land 580b and the adjacent housing end wall. The spring 582 urges the valve and piston 568 towards the left end of the housing.

When the piston is in its left hand position, pressure from the by-pass conduit 538 flows freely around the valve (between lands 568a and 568b) into conduit 542. At the same time, the outlet pressure in conduit 542 is delivered to the left side of piston land 568a by branch conduit 564, and the piston thereby is moved slowly towards the right, first against the action of spring 582, and thereafter against the opposing force exerted by the pressure admitted through conduit 540. As the piston is moved to the right, fluid pressure from conduit 542 fills bore 576. The entire end surface of piston 568 is then exposed to the force of the fluid pressure, and therefore, the piston 568 is moved further to the right so that land 568a partially covers conduit 542, reducing the pressure flow in conduits 542 and 564 until a balance is substantially attained between the latter and the spring 582.

The fluid pressure delivered to the regulator valve S through conduit 540 initially has no effect on the position of piston 568 because of the action of the spring 582. When this pressure increases to a point where it exerts a greater force against the piston and valve than spring 582, valve 580 is moved thereby to the right against the housing wall. Also, the pressure from conduit 540 reacts against the right side of piston 568, moving the latter to the left until a balance is reached with the increased regulator valve outlet pressure in conduit 542 and 564. If, in the event, the pressure in conduit 542 decreases due to a leak in the high range clutch E, for example, the piston 568 is moved to the left, thereby permitting full gallery pressure from conduit 538, to flow between lands 568a and 568b.

From the above description it will be seen that the shift regulator valve S controls the pressure flow to the high range clutch E and assists in maintaining a predetermined high pressure in conduit 542 while the clutch E is engaged. During a shift from the low to the high range through the planetary system, for example the regulator valve S first acts to admit an increasing gallery pressure into conduit 542 (as the pump output increases), then momentarily the pressure increase is retarded (even through the vehicle speed and gallery pressure are increasing), and thereafter the pressure in conduit 542 is permitted to increase until it reaches the maximum gallery pressure. This delay in the rate of pressure increase in conduit 542 allows sufficient time for the low range brake D to be fully released before the high range clutch E is engaged.

During a downshift, pressure in conduits 540 and 534 is vented through vent port 510 in the low high shift valve N. As the piston 568 is moved to the right the radial piston ports 574 are aligned with a vent port 586, and the pressure in conduit 542 and piston bore 576 is abruptly vented therethrough. When the pressure in conduit 542 is reduced to a point where it produces a force approximately equal to that of spring 582, the piston is moved to the left by the spring, and the remainder of the pressure in conduit 542 flows through conduits 538, 534, and 484 to vent port 510 in the low high shift valve N. The rapid venting action of the shift regulator valve S during a down-shift, ensures that the high range clutch E is fully released before the low brake D is engaged, thereby providing a smooth transition between the planetary gear ranges and preventing the early failure of the high range clutch.

As shown in Figure 2a, the modulating valve T has a housing 610 with an inlet port 612 connected with the governor pressure conduit 340. The housing also has radial ports 614 and 616 in its side connecting with the pump valve conduit 272 and a branch conduit 484a of the low-high shift valve conduit 484, respectively. The left hand end of the housing is connected with conduit 534 through a branch conduit 534a.

A valve 620 having lands 620a and 620b near its opposite ends, is reciprocably mounted within the housing 610, and is normally urged against the left hand end thereof by a spring 622. The spring 622 is retained between the right end of the valve and a stop member 624 which is fixedly mounted at the right end of the housing. When the valve is moved to the left, land 620a opens port 612 and land 620b closes port 616. Fluid pressure is then permitted to flow from the governor pressure conduit 340 around the valve, and into conduit 272 connecting with the pump regulator valve I. As previously explained, under these conditions, the pump regulator valve I acts to reduce the gallery pressure in accordance with the speed of the vehicle.

When the low-high shift valve N admits fluid pressure to conduits 484, 534 and 542 to activate the high range clutch E, pressure from line 534a exerts a force against the left side of the modulating valve, and the latter is urged towards the right against the action of spring 622. Land 620a then covers the inlet port 612, and land 620b opens port 616, whereupon pressure flows from conduit 484a to conduit 272. As previously described, the pressure delivered through conduit 272 assists in moving the pump regulator valve 260 to the right and the front pump pressure thereby is reduced. If the high range clutch E is operative and the pressure in conduit 484a is below a predetermined limit the proportionately reduced pressure admitted to conduit 272 is not sufficient to move the pump regulator valve 260 to the right. Thus, the gallery pressure is permitted to increase, thereby ensuring the high range clutch E of adequate pressure to remain fully engaged. It will be noted that this latter condition (of relatively low pressure in conduit 484) is most likely to occur when the engine torque is high and vehicle speed is low, as for example, when starting in high range converter, and it is under these circumstances, that maximum gallery pressure is required to prevent the high range clutch from slipping.

It will be appreciated that another outstanding feature of the applicant's pump regulator valve I is that in combination with the closed fluid circuits connecting the various control valves and transmission clutches and brakes with the reservoir, it acts to compensate for loss of pressure due to leakage in the high range clutch under conditions of high engine torque. In this respect, it will be seen that if a leak should occur in or near the high range clutch, the resulting loss of pressure in lines 542, 534 and 534a will effect the movement of the modulating valve 620 to the left due to the action of the spring 622. As a result under conditions of high engine torque normally developed at low engine speeds, a proportionally lower governor pressure is admitted from conduit 340 and conduit 272 to the regulator valve I, near the left side of the valve land 260d. As a result, the then relatively high throttle limit pressure delivered through conduit 268 and the force of spring 266 tends to move the regulator valve 260 to the left, overcoming the governor pressure, which is exerting a force in the opposite direction. As previously explained, movement of the regulator valve to the left causes valve land 260b to cover conduit 274 with the result that the pressure in the gallery 250 is increased.

With particular reference to Figure 7, it will be seen that the manual selector valve U has a cylindrical housing 660 with radially disposed ports 662, 664, 666, 668, 670, 672 and 674 along its side. Ports 662 and 666 communicate with the high clutch pressure conduit 534 and a branch conduit 534a connecting therewith, respectively, and port 664 communicates with a high-low shift valve pressure line 484. Ports 668 and 670 connect with the low brake pressure conduit 532 and a branch conduit 532a thereof, and port 672 communicates with the gallery 250 through conduit 676. Port 674 connects with conduit 678 which in turn communicates through branch conduits 678a and 678b with the reverse shuttle valve V and the operative side of piston 679 of the reverse brake F, respectively.

A valve 680 having lands 680a, 680b, 680c, and 680d is mounted for reciprocable movement within the housing 660, and its right hand and is connected to a lever 682 by a pin 684, which in turn may be secured by suitable linkage (not shown) to a conventional manual gear shift lever. By selectively positioning the gear shift lever, the driver may move valve 680 to one of five positions, indicated generally at 686; namely $$\frac{N}{P}$$

designating the "neutral or park" position, "." indicating the normal driving range, "D" for rapid acceleration, "L" for low gear drive, and "R" for reverse.

A series of five detents 688 are formed along the left hand end of valve 680 which corresponds to the five manually selectable positions indicated above. Two spring biased ball elements 690 and 692 are mounted for reciprocable movement at right angles to the longitudinal axis of valve 680, and are adapted to engage one of the five detents 688 thereby holding the valve 680 in one of its five manually selectable positions. The ball elements 690 and 692 are housed within radially disposed cylinder chambers 694 and 696, respectively, which are secured to the side of the housing 660, near its left hand end. The elements 690 and 692 are urged into engagement with the valve detents 688 by springs 698 and 700 retained between the elements and the outer housing end walls 702 and 704, respectively. Fluid pressure from the governor conduit 340 is introduced through branch conduits 340b and 340c to each of the chambers 694 and 696, respectively. Thus, when the vehicle is driven, and the governor pressure is increased accordingly, the ball elements 690 and 692 are held firmly in engagement with the detents 688. The selector valve 680 is thereby held in position and cannot be accidentally moved while driving.

A radial bore 706 near the right end of the selector valve 680 is disposed so that it is aligned with conduit 678 only when the selector valve is placed in the "L" position. The radial bore 706 connects with an axial bore 708, which in turn communicates through suitable means (not shown) with the sump. Conduit 678 communicates with the recessed portion of the right end of valve 680 in the "P," "." and "D" positions of valve U which permits the reverse brake F to be vented to the sump through suitable means (not shown).

The reverse shuttle valve V, shown in Figure 8, includes a cylindrical housing 710 disposed in axial alignment with the longitudinal axis of the modulating valve housing 610, and is separated therefrom by the stop member 624. It will be appreciated that the two housings may be formed separately if desired. Housing 710 has radial ports 712 and 714 formed near its opposite ends which connect with branch conduit 678a from the manual selector valve U, and conduit 716 communicates with the inoperative side of piston 679 of the reverse brake F. A branch conduit 676a connects the gallery pressure conduit 676 with a third radial port 718 formed near the middle of housing 710.

A valve 720 having lands 720a and 720b near its opposite ends is reciprocably mounted within the housing. The valve 720 is urged to the left into engagement with stop member 624 by a spring 722 retained between the right end of the valve and a fixed spring retaining element 726.

When the manual selector valve U is positioned in any of its five positions except "R" reverse, the selector valve port 674 is closed and, therefore, fluid pressure cannot flow to the left side of the reverse shuttle valve 720 through conduit 678a, as a result spring 722 normally maintains the valve 720 in its left hand positions, and gallery pressure from conduit 676a is permitted to flow between lands 720a and 720b into conduit 716, and thence to the upper (release) side of the reverse brake piston 679. Thus, the reverse brake F is held positively in its inoperative position when any of the forward driving ranges are engaged.

When pressure is admitted to the left end of housing 710 through conduit 678a, valve 720 is moved to the right so that land 720a covers port 718 and land 720b uncovers radial vent port 728 in the housing. Gallery pressure then flows through manual selector valve U to conduits 678 and 678b to the under (operative) side of the reverse brake piston 679, engaging the reverse brake F. The fluid pressure on the upper side of the piston is vented through line 716 and vent port 728.

The following paragraphs contain a description of the automatic operations of the control system in each of the various driving ranges.

With particular reference to Figures 2 and 2a disclosing the manual selector valve U in its neutral and park $$\frac{N}{P}$$

position, it will be seen that land 680d of the manual selector valve 680 covers the gallery pressure inlet port 672, and ports 666, 668, and 670, are all connected with vent port 730 which is uncovered by land 680c. Thus, the high range clutch E and the low range brake D are inactivated, and the reverse brake F is held in its inoperative position, in the manner previously described. Also, it will be noted that the throttle limit valve pressure (from conduit 268) and spring 266 maintain the pump regulator valve 260 in its left hand position, and front pump pressure is permitted to flow to the converter valve J, and thence to the converter A. Thus, the converter A is maintained in readiness for immediate use.

Figures 9 and 9a show the control system in the "." high range converter (normal driving range) position. It will be seen that as the vehicle commences to move, the relatively high throttle pressure and low governor pressure conditions the direct shift valve K (valve 486 to the left) so that converter lock-up clutch B is disengaged, and front pump (gallery) pressure is delivered through the pump regulator valve I and the converter valve J to the converter A. Lands 680c and 680d of the manual selector valve U are disposed so that gallery pressure from port 672 is permitted to flow through conduit 534a and 534 to the inoperative side of the low range brake piston 535. Pressure from conduit 534 and the force exerted by the low brake spring 535a, move the piston 535 downwardly to its inoperative position, and the pressure in conduit 532 is forced back to the gallery 250. Also, gallery pressure from conduit 534 flows through the shift regulator valve S to the high range clutch E, and the latter is thereby engaged. Pressure from low high shift valve conduit 484 is prevented from flowing through the manual selector port 662, by selector valve land 680b.

With reference to Figures 10 and 10a, it will be seen that as the speed of the vehicle increases, a proportionately increased governor pressure is delivered to the right side of the low high shift valve 520, through conduits 340 and 340a. Piston 514 is thereby moved to the left (if not in its left hand position) and gallery pressure from conduit 502 is permitted to flow into conduit 484 to the manual selector valve and the direct shift valve K. The increased governor pressure is also delivered through conduit 340 to the left side of the direct shift valve K, and valve 486 is thereby moved to the right. As a result, gallery pressure from conduit 484 is delivered through conduit 482 to engage the converter lock-up clutch B. At the same time, fluid pressure is delivered through branch conduit 302 to the converter valve J, which reduces the pressure flow to the converter A by a fixed percentage and the latter is inactivated.

If the driver wishes to delay the engagement of the lockup clutch B (for more rapid acceleration) he simply depresses the accelerator sufficiently to maintain vehicle acceleration, and the lock-up clutch will not be engaged until the vehicle has attained a relatively high driving speed. As previously explained, under conditions of high engine torque, the throttle valve L delivers a proportionately high throttle pressure (valve land 390a closes vent port 372 and valve land 390b further opens port 374) to the direct shift throttle valve Q, and thence to the right side of the direct shift valve K through conduit 454. The increased throttle pressure on the right side of the direct shift valve 486 plus the action of spring 488 exceeds the increased governor pressure delivered to the left hand side of the valve. Thus, the valve 486 is maintained in its left hand position and the converter lockup clutch B remains inoperative.

When additional power is required while the lock up clutch B is engaged, the converter may be re-activated (within a certain maximum speed limit) by further depressing the accelerator. As previously described, an increased fluid pressure is then delivered to the right side of the direct shift valve 486, moving it to the left against of the governor pressure, and thereby releasing the lock-up clutch. It will be appreciated that the valve 486 cannot be moved to the left when the opposing governor pressure exceeds a predetermined maximum limit.

If the accelerator pedal is depressed to the kick-down position, the throttle valve L is conditioned to deliver full gallery pressure through conduit 406 to the low high shift valve N. As previously explained, the piston 514 and valve 520 are consequently moved to the right providing the governor pressure opposing their movement in this direction does not exceed a predetermined limit. As a result, gallery conduit 502 is closed, and therefore no pressure can flow through conduit 484 to the lock-up clutch conduit 482, regardless of the position of the direct shift valve K.

The diagram shown in Figures 11 and 11a discloses the manual selector valve U in "D" position for rapid acceleration, and with the control system operative to engage the low-range converter drive. As will be seen, the selector valve land 680c closes port 666 and gallery fluid pressure from conduit 676 is permitted to flow through ports 668 and 670. Gallery pressure from conduit 676 is thus admitted to conduit 532, connecting with the operative side of the low brake piston 534. Also ports 662 and 664 are disposed between lands 680a and 680b, however, no pressure flows therebetween because the low high shift valve N closes connecting conduit 484. As a result, the high range clutch E remains inoperative, and no pressure is delivered to the release side of the low range brake D through connecting conduit 534. Front pump pressure from the gallery 250 is supplied through the pump regulator valve I and the converter valve J, to the converter A. In addition, throttle pressure is delivered to the direct shift throttle Q, and thence to the right side of the direct shift valve K, with the result that the direct shift valve 486 is maintained in its left hand position (the governor pressure then being low) and thus the converter lock-up clutch B is rendered inoperative. Further, it will be noted that the manual selector valve port 674 is blocked off from the gallery pressure inlet port 672 by selector valve land 680d, and the reverse shuttle valve V is conditioned to admit gallery pressure to conduit 716 connecting with the release side (upper side) of the reverse brake piston 679.

As the vehicle is accelerated, and the governor pressure is proportionately increased, the low-high shift valve piston 514 is moved to the left. Gallery pressure from conduit 502 is then permitted to flow through conduit 484 to the manual selector valve U, and from there through conduits 534, 538 and 542 to the high range clutch E. Pressure from conduit 534 is also delivered to the upper or release side of the low brake piston 535. As shown in Figures 12 and 12a, the transmission is then conditioned to operate in high range converter.

Normally, the control system is arranged so that the transition from the low to the high range converter will be made at moderate driving speeds; i. e. approximately 30 to 35 miles per hour or less depending upon the position of the accelerator pedal. If the operator desires to retard the engagement of the high range clutch in order to obtain more rapid acceleration, he needs only to depress the accelerator sufficiently to maintain vehicle acceleration. As previously explained, this causes a high throttle valve pressure to be delivered through conduit 504 to the left side of piston 514 in the low high shift valve N, and this increased pressure together with the force of spring 518 retards the movement of piston 514 and valve 520 to the left due to the force exerted by the governor pressure at its right end. However, if the speed of the vehicle has increased to a point where the governor pressure force exceeds the force exerted by the throttle pressure and spring, the piston 514 will be moved to the left and consequently the high range clutch will be engaged, regardless of the position of the accelerator pedal. For efficient operation of the transmission described in this application it has been found practical to arrange the control system so that the high range clutch E is engaged under normal conditions, after the vehicle has attained a speed of approximately 31 miles per hour.

With reference to Figures 13 and 13a, it will be seen that as the speed of the vehicle increases and the governor pressure is proportionately increased, the governor pressure delivered through conduit 340 moves the direct shift valve 486 to the right. As a result, gallery pressure is permitted to flow through conduit 484 into conduit 482 (assuming the low high valve is opened) and thence to the converter lock-up clutch B, and also through connecting conduit 302 to the converter valve J, and the converter A.

If a sudden increase in power is required while driving in high range direct with the manual selector valve U in the "D" position, the operator depresses the accelerator pedal to its kickdown position (beyond full throttle). As previously explained, the throttle valve is then conditioned to admit full gallery pressure to the direct shift throttle valve Q, and thence through conduit 454 to the right side of the direct shift valve K. As shown in Figures 14 and 14a, the direct shift valve 486 is thus moved to the left, releasing the converter-lock-up clutch B; the pressure in conduit 482 then being vented through vent port 494.

At the same time, gallery pressure from the throttle valve L is delivered by conduit 406 to the left side of valve land 520b in the low-high shift valve N. Valve 520 and piston 514 are thereupon moved to the right, covering the gallery pressure conduit 502. Consequently, no pressure is delivered to conduit 484, and the pressure from the release side of the low range brake D and the high range clutch E is vented to the sump through lines 542, 538, 534, 484 and vent port 510. At the same time, the gallery pressure admitted to the operative side of the low range brake D through conduit 532 (and gallery conduit 676), moves the low range brake piston 535 against the action of spring 535a, thereby effecting the engagement of the low range geared drive.

It will be appreciated that when the accelerator is moved to its kick-down position, the low range planetary drive will be engaged only when the manual selector valve is in the "D" position, and the governor pressure at the right side of the low high shift valve N has not increased to a point where it exerts a greater force than the combined force of the throttle pressure and spring 518 urging the low high valve 520 and piston 514 in the opposite direction. If the governor pressure exceeds this point, the high range clutch E will remain operative, but the direct shift valve K may still effect the release of the converter lock-up clutch B. If, however, the governor pressure exceeds a predetermined maximum limit, even the lock-up clutch B will not be released because the throttle valve pressure admitted to the right side of the direct shift valve K is not sufficient to move valve 486 to the left.

Also it will be appreciated, that within a certain range of throttle settings and moderate vehicle speeds, a double shift from low range converter to high range direct (and vice versa) will occur, due to the fact that the direct shift valve K may be opened prior to the admission thereto of fluid pressure from the low high shift valve N. Thus when the low high shift valve is conditioned to effect engagement of the high range drive, the converter lock-up clutch will be simultaneously engaged.

Further, it will be seen that when the throttle setting is reduced following a full throttle setting for rapid acceleration, the direct shift throttle valve Q (which regulates to zero pressure when its intake pressure is less than 35 p. s. i.) serves to effect a momentary delay in the reengagement of the converter lock-up clutch B. This is due to the fact that the direct shift throttle valve Q is adapted to rapidly adjust its output pressure for corresponding reductions in the throttle valve pressure, utilized to operate the direct shift valve K (through connecting conduits 448 and 454). It is apparent that when the throttle pressure is less than 35 p. s. i. the valve Q remains closed, and therefore there is no delay in the reengagement of the converter lock-up clutch B.

Figures 15 and 15a show the manual selector valve U in the "L" or low range converter position. As will be seen, the selector valve land 680a closes conduit 534 and branch conduit 534a is vented through port 730. Land 680c closes port 668 and gallery fluid pressure from conduit 676 is permitted to flow through port 670 to conduit 532. Land 680d covers port 764 and the pressure in line 678 is vented through bores 706 and 708 to the sump. Pressure from conduit 532 is delivered to the under (operative) side of piston 535 in the low range brake D. The pressure in conduit 534 connecting with the upper (inoperative) side of piston 535 is vented through branch conduit 534a and vent port 730 in the manual selector valve U.

When the vehicle's speed (and thus the governor pressure) is relatively low, the low-high shift valve N is conditioned to close the gallery pressure conduit 502, and the direct shift valve K is conditioned to release the converter lock up clutch B. In addition, gallery pressure from conduit 676 and branch conduit 676a is permitted to flow through the reverse shuttle valve V into conduit 716 connecting with the upper (release) side of the reverse brake piston 679. As previously mentioned, fluid pressure from the lower (operative) side of the reverse brake piston 679, may be vented through conduits 678b, 678 and through bores 706 and 708 to the sump.

When the speed of the vehicle is increased sufficiently the proportionally increased governor pressure in conduit 340a moves the low high shift valve 520 and piston 514 to the left, as shown in Figures 16 and 16a, permitting gallery pressure to flow through conduit 484. Also the increased governor pressure moves the direct shift valve 486 to the right permitting pressure from line 484 to flow through conduit 482 to the converter lock-up clutch B. As previously mentioned the manual selector valve U prevents pressure in conduit 484 from flowing through conduit 534 to the high range clutch, and the latter is vented through the selector valve vent port 730. It will be noted that the converter lock-up clutch B can be engaged while in low range only when the manual selector valve is in the "L" position.

Figures 17 and 17a, disclose the manual selector valve U in the "R" or reverse drive position. It will be seen that the selector valve land 680c prevents the gallery pressure in line 676 from flowing through conduits 532, 532a, 534, and 534a. Thus, both the high range clutch E and low range brake D are rendered inoperative. Land 680d uncovers port 672 and gallery pressure from conduit 676 is permitted to flow through conduits 678 and 678a to the left side of the reverse shuttle valve V, and the shuttle valve 720 is thereby moved to the right, closing conduit 676a. Gallery fluid pressure also flows through conduits 678 and 678b to the under (operative) side of the reverse brake piston 679, and the reverse planetary drive is engaged. The pressure on the upper (inoperative) side of the brake piston 679, is vented to the sump through line 716 and vent port 728 in the reverse shuttle valve V.

It will be noted that when the manual selector valve U is in either the "L" or "R" position, the operative or inoperative sides, respectively, of the reverse brake piston are vented. This feature permits the positive engagement of the low range and reverse drive in rapid succession.

It will be appreciated that an important feature of this transmission control system is that in all driving ranges, except when the manual selector valve is in the "L" position, the converter lock-up clutch B is never engaged before the high range clutch E becomes operative. This arrangement assists in obtaining a smooth, effortless transition between low and high range planetary systems and it also ensures that a relatively high degree of useful torque is delivered to the output shaft while the vehicle is accelerating through the various speed ranges. During a downshift, however, the governor pressure delivered to the left side of the direct shift valve K is not reduced as rapidly as the throttle pressure delivered to the right side thereof, and therefore, the direct shift valve 486 remains in its right hand position as the vehicle is decelerating.

The converter lock-up clutch B consequently remains in engagement until a relatively low driving speed is attained; this speed being substantially lower than that at which the lock-up clutch is engaged while the vehicle is accelerating. Thus, engine compression may be utilized for braking the vehicle.

Another outstanding feature of the applicant's control system is that the operative pressure for each of the hydraulic control valves may be conveniently varied, so that the transmission may be adapted for use with different types of engines. In addition, the automatic operation of the transmission may be modified so as to follow generally the normal driving habits and power requirements of the operator.

For example, it has been found that for the transmission described, maximum economy, rapid acceleration and smooth operation may be obtained when the control system is arranged to operate as follows:

I. *Manual selector valve in the "D" position (rapid acceleration)*.—With normal light throttle acceleration, the shift from low to high range will occur at approximately 15 to 20 M. P. H., and the shift from converter to direct drive at approximately 31 M. P. H.

Once the direct drive (lock-up) clutch has been engaged it will remain engaged during a steady decrease in vehicle speed until a speed of approximately 18 M. P. H. is attained.

If moderate accelerating power is required, the direct drive lock-up clutch can be disengaged by a downward movement of the accelerator at any time up to approximately 45 M. P. H. The system then returns from the direct drive to the torque converter and drive through the planetary gear system.

If maximum power (kickdown) is required, the accelerator is depressed beyond full throttle and the low range converter drive will be engaged at any speed up to approximately 68 M. P. H.

II. *Manual selector valve in the "." position (normal acceleration)*.—As the car commences to move, the power is delivered through the torque converter and the planetary gears at a 1:1 ratio, and with normal acceleration, the shift from high range converter to high range direct drive will occur at approximately 28 M. P. H.

III. *Manual selector valve in the "L" position (manual low range converter).*—In this setting, the drive is through the torque increasing setting of the planetary gears at all times, but direct drive is obtained in combination with the low gear ratio at approximately 31 M. P. H., and will remain engaged while decelerating or coasting until a speed of 18 M. P. H. is attained. This feature is of considerable use when ascending or descending a steep hill.

It is to be understood that the terminology employed in the specification is for the purpose of description and not of limitation. Also, it is to be understood that the following claims are not to be considered as limited to the details of construction and arrangement of parts illustrated and described in the specification, since the invention is capable of other embodiments and of being practiced or carried out in various ways.

I claim:

1. In a hydraulic control system for a transmission for an accelerator pedal controlled engine having low and high driving ranges, an output shaft, a pressure reservoir, hydraulically operated clutch means to engage the high range drive, and control valve means connecting with the reservoir and the clutch means to effect the engagement of the high range drive, a pressure regulating system comprising pump means to deliver fluid under pressure to the reservoir, a regulator valve connecting with the reservoir and said pump means to regulate the fluid pressure in the reservoir, said regulator valve including piston means movable in one direction to increase the fluid pressure delivered to the reservoir by said pump means, and movable in the opposite direction to decrease the fluid pressure delivered to the reservoir by said pump means, a throttle control valve connecting with the reservoir to deliver throttle pressure to the regulator valve which is substantially proportional to the speed increasing position of the accelerator pedal to move the piston means in said one direction, a modulating valve connecting with the reservoir and said regulator valve, a speed responsive governor control valve operatively responsive to the speed of rotation of the output shaft connecting with said pump means to deliver fluid pressure to the modulating valve which is substantially proportional to the speed of rotation of the output shaft, said modulating valve being movable in one direction to admit governor pressure to the regulator valve to move the piston means thereof in said opposite direction, and said modulating valve being movable in the opposite direction to admit reservoir pressure to said regulator valve to move the piston means thereof in said opposite direction when the high range clutch means is engaged.

2. In a hydraulic control system for a transmission for an accelerator pedal controlled engine having low and high driving ranges, an output shaft, a pressure reservoir, hydraulically operated clutch means to engage the high range drive, a pressure regulating system comprising pump means to deliver fluid under pressure to the reservoir, a regulator valve connecting with the reservoir and said pump means to regulate the fluid pressure in the reservoir, said regulator valve including piston means movable in one direction to increase the fluid pressure delivered to the reservoir by said pump means, and movable in the opposite direction to decrease the fluid pressure delivered to the reservoir by said pump means, a throttle control valve operatively responsive to the speed increasing position of the accelerator pedal and connecting with the reservoir to deliver throttle pressure to the regulator valve which is substantially proportional to the speed increasing position of the accelerator pedal to move the piston means thereof in said one direction, a modulating valve connecting with the reservoir and said regulator valve, a speed responsive governor control valve operatively responsive to the speed of rotation of the output shaft connecting with said pump means to deliver fluid pressure to the modulating valve which is substantially proportional to the speed of rotation of the output shaft, said modulating valve being movable in one direction to admit governor pressure to the regulator valve to move the piston means thereof in said opposite direction, and said modulating valve being movable in the opposite direction to admit reservoir pressure to said regulator valve to move the piston means thereof in said opposite direction, resilient means to move said modulating valve in said one direction, and control means connecting with the reservoir and being responsive to increased speeds of rotation of the output shaft and to the movement of the accelerator pedal towards its speed increasing position, to deliver fluid pressure to said high range clutch means to engage the high range drive, and to the modulating valve to move the latter in said opposite direction.

3. In a hydraulic control system for a transmission for an accelerator pedal controlled engine having low and high ranges, a drive shaft and an output shaft, and clutch means to engage the high range drive, a pressure regulating system comprising a fluid pressure reservoir, first pump means operatively responsive to the rotation of the drive shaft to deliver fluid under pressure to the reservoir, second pump means operatively responsive to the rotation of the output shaft to deliver fluid under pressure to the reservoir, means to inactivate one of the pump means when the other delivers a greater fluid pressure to the reservoir, a regulator valve connecting with the reservoir and the first pump means to regulate the fluid pressure in the reservoir, said regulator valve including piston means movable in one direction to increase the fluid pressure delivered to the reservoir by said first pump means, and movable in the opposite direction to decrease the fluid pressure delivered to the reservoir by said first pump means, a throttle control valve operatively responsive to the speed increasing position of the accelerator pedal and connecting with the reservoir to deliver throttle pressure to the regulator valve which is substantially proportional to the speed increasing position of the accelerator pedal to move the piston means thereof in said one direction, a modulating valve connecting with the reservoir and said regulator valve means, a speed responsive governor control valve operatively responsive to the speed of rotation of the output shaft connecting with said second pump means to deliver fluid pressure to the modulating valve which is substantially proportional to the speed of rotation of the output shaft, said modulating valve being movable in said one direction to admit governor pressure to the regulating valve to move the piston means thereof in said opposite direction, and movable in the opposite direction to admit reservoir pressure to said regulator valve to move the piston means thereof in said opposite direction, resilient means to move said modulating valve in said one direction, and means connecting with the clutch means to move the modulating valve in said opposite direction when the high range drive is engaged.

4. In a hydraulic control system for a transmission for an accelerator pedal controlled engine having low and high ranges, a drive shaft and an output shaft and clutch means to engage the high range drive, a pressure regulating system comprising a pressure reservoir, first pump means operatively responsive to the rotation of the drive shaft to deliver fluid under pressure to the reservoir, second pump means operatively responsive to the rotation of the output shaft to deliver a relatively high fluid pressure to the reservoir when the output shaft is rotated at increased speed; said first pump means being adapted to deliver a higher output pressure at relatively low speeds of rotation of the drive shaft, a regulator valve connecting with the reservoir and the first pump means to regulate the fluid pressure in the reservoir, said regulator valve including means to vent the pressure output of one of the pump means when the other pump means delivers a greater fluid pressure to the reservoir, and said regulator valve also including piston means movable in one direction to increase the fluid pressure delivered to the reservoir by said first pump means, and movable in the opposite direction to decrease the fluid pressure delivered to the reservoir by said first pump means, a throttle valve operatively responsive to the speed increasing position of the accelerator pedal and connecting with the reservoir to deliver throttle pressure which is substantially proportional to the speed increasing position of the accelerator pedal to the regulator valve to move the piston means thereof in said one direction, valve means connecting in series between the throttle control valve and the regulator valve to reduce the throttle pressure delivered thereto by a predetermined fixed amount, a modulating valve connecting with the reservoir and said regulator valve, a speed responsive governor control valve operatively responsive to the speed of rotation of the output shaft connecting with said second pump means to deliver fluid pressure to the modulating valve which is substantially proportional to the speed of rotation of the output shaft, said modulating valve being movable in one direction to admit governor pressure to the regulating valve to move the piston means thereof in said opposite direction, and said modulating valve being movable in the opposite direction to admit reservoir pressure to said regulator valve to move the piston means thereof in said opposite direction, resilient means to move said modulating valve in said one direction, and means connecting with said high range clutch means to move the modulating valve in said opposite direction when the high range drive is engaged.

5. In a hydraulic control system for a vehicle transmission with selectively engageable low and high driving ranges for an accelerator pedal controlled engine including a pressure reservoir, a sump, pump means connecting with the sump and reservoir, a governor control associated with the control system to supply fluid pressure substantially proportional to the speed of the vehicle and a throttle control associated with the control system to deliver fluid pressure substantially proportional to the speed increasing position of the accelerator pedal, a regulator valve comprising a cylinder housing with closed ends having radial inlet ports near one end and near its center portion, respectively, both connecting with the reservoir, two radial ports communicating with the interior of the housing between said last mentioned ports communicating with said pump means and the sump, respectively, a valve member reciprocably mounted within said housing having three lands of equal diameter near one end of the valve member adjacent said one end of the housing, the center portion, and near its opposite end, respectively, said valve member also having a fourth land of larger diameter formed about its opposite end, and resilient means to move said valve member toward said one end of the housing so that said centrally disposed land reduced the pressure flow from said pump means to the sump, and the reservoir pressure delivered to the interior of the housing near said one end thereof tending to move the valve member in the opposite direction against the action of the resilient means to increase the pressure flow from said pump means to the sump, fluid conveying means connecting with the reservoir and the regulator valve housing near its opposite end to deliver reservoir fluid pressure which reacts against the larger valve member land to assist in moving said valve member in said opposite direction, fluid conveying means to deliver governor pressure to the regulator housing near its opposite end which reacts against the larger valve member land to assist in moving said valve member in said opposite direction, means connecting with the selectively engageable high range drive to close the governor pressure fluid means when the high range drive is engaged, and fluid conveying means connecting the throttle control with said housing to deliver fluid pressure to the housing which reacts against said larger land of the valve member to move the latter toward said one end of the housing.

6. A hydraulic control system for a vehicle transmission for an accelerator pedal controlled engine including a drive shaft connecting with a torque converter and a relatively low speed high torque drive connecting with an output shaft comprising, a hydraulically operated clutch means to engage the high range drive and to disengage the low range geared drive, a hydraulically operated means to engage the low range drive to disengage the high range drive, a hydraulically operated converter lock-up clutch means, a fluid pressure reservoir connecting with the low and high range engaging operating means and the converter lock-up clutch means, valve means connecting with the reservoir which is operatively responsive to an increased speed of rotation of the output shaft to deliver fluid pressure to the converter lockup clutch means, means to inactivate the converter lockup clutch means when the low range drive is engaged, first pump means operatively responsive to the rotation of the drive shaft to supply fluid under pressure to the reservoir, a second pump means operatively responsive to the rotation of the output shaft to deliver fluid under pressure to the reservoir, means to inactivate one of the pump means when the other delivers a greater fluid pressure to the reservoir, a regulator valve to control the fluid pressure in the reservoir, said regulator valve including piston means movable in one direction to increase the fluid pressure delivered to the reservoir by either of said pump means and movable in the opposite direction to decrease the fluid pressure delivered to the reservoir by either of said pump means, means connecting with the reservoir to deliver throttle pressure substantially proportional to the speed increasing position of the accelerator pedal to said regulator valve to move the piston means thereof in said one direction, a modulating valve connecting with the reservoir and the regulator valve, a speed responsive governor control connecting with said second pump means to deliver governor pressure proportional to the speed of rotation of the output shaft to the modulating valve, said modulating valve being movable in one direction to admit governor pressure to said regulating valve to move the piston means thereof in said opposite direction, and said modulating valve being movable in the opposite direction to deliver reservoir pressure to said regulator valve to move the piston means thereof in said opposite direction, resilient means to move said modulating valve in said one direction, and means responsive to the fluid pressure delivered by said control valve to the high range engaging means to move the modulating valve in said opposite direction.

7. A vehicle transmission and control system for an accelerator pedal controlled engine comprising a drive shaft, a multispeed drive including gears, with a relatively low speed high torque drive and a relatively high speed low torque drive, means to drivingly connect the drive shaft and the multispeed drive, a hydraulically operated means to engage the high range drive, a hydraulically operated piston means adapted to engage and positively disengage the low range drive, an output shaft connecting with the multispeed drive, a fluid pressure reservoir, fluid conveying means connecting the reservoir with the high range engaging means and the low range engaging and disengaging means, a control valve connecting with the reservoir, said control valve being movable in one direction to admit fluid pressure to the high range engaging means and to the piston means to disengage the low range drive, said control valve being movable in the opposite direction to vent fluid pressure delivered to the high range engaging means and to the low range disengaging piston means, a speed responsive governor control connecting with the reservoir to deliver pressure proportional to the speed of rotation of the output shaft to the control valve to move it in said one direction and a throttle control connecting with the reservoir to deliver throttle pressure substantially proportional to the speed increasing position of the accelerator to the control valve to move it in said opposite direction, pump means connecting with the reservoir to deliver fluid under pressure to the reservoir, a regulator valve connecting with pump means and the reservoir to control the fluid pressure in the reservoir, said regulator valve including piston means movable in one direction to increase the fluid pressure in the reservoir and the piston means being movable in the opposite direction to decrease the fluid pressure in the reservoir, conduit means connecting the throttle control with said regulator valve to deliver throttle pressure thereto to move said piston means in said one direction, a modulating valve connecting with the governor control and said control valve, said modulating valve being movable in one direction to admit governor pressure to said regulator valve to move the piston means thereof in said opposite direction, resilient means to move the modulating valve in said one direction and means connecting with said high range engaging means and responsive to fluid pressure delivered to the high range engaging means by said control valve to move the modulating valve in said opposite direction.

8. A vehicle transmission and control system as described in claim 7 including means to reduce the throttle pressure delivered to the regulator valve by a predetermined fixed amount.

9. A self-compensating pressure regulating system for a vehicle transmission for an accelerator pedal controlled engine including a drive shaft connecting with a torque converter and a relatively low speed high torque drive and a relatively high speed low torque drive connecting with an output shaft comprising, a hydraulically operated means to engage the high range drive and to disengage the low range drive, a hydraulically operated means to engage the low range drive and to disengage the high range drive, a hydraulically operated converter lock-up clutch means, a fluid pressure reservoir connecting with the low and high range engaging means and the converter lock-up clutch means, control means connecting with the reservoir which is operatively responsive to an increased speed of rotation of the output shaft to deliver fluid pressure to the converter lock-up clutch means to operate the latter, second control means connecting with the reservoir which is operatively responsive to an increased speed of rotation of the output shaft and the movement of the accelerator pedal towards its speed increasing position to deliver fluid pressure to low and high range engaging means to effect the engagement of the low and high range drive, and means associated with said second means to inactivate said first control means when the low range drive is engaged, first pump means operatively responsive to the rotation of the drive shaft having intake and output ports to deliver fluid pressure through said output port to the reservoir, a second pump means operatively responsive to the rotation of the output shaft to deliver fluid pressure to the reservoir, check valve means to cut off the fluid pressure flow from one of said pump means to the reservoir when the other delivers a greater fluid pressure thereto, a regulator valve connecting with the reservoir and the output port of said first pump means to regulate the fluid pressure in the reservoir, fluid conveying means connecting the regulator valve with the intake port of said first pump means, said regulator valve including piston means movable in one direction to increase the fluid pressure delivered to the reservoir by said first pump means, and movable in the opposite direction to decrease the fluid pressure flow delivered to the reservoir by said first pump means and to return said first pump means output pressure to the intake port thereof, resilient means to move said piston means in said one direction, throttle control means connecting with the reservoir and accelerator pedal to deliver throttle pressure substantially proportional to the speed increasing position of the accelerator pedal to said regulator valve to move said piston means in said one direction, a modulating valve connecting with the reservoir and said regulator valve, a speed responsive governor control means connecting with said reservoir to deliver governor pressure which is substantially proportional to the speed of rotation of the output shaft to the modulating valve, said modulating valve being movable in one direction to admit governor pressure to said regulating valve to move said piston means thereof in said opposite direction, and said modulating valve being movable in the opposite direction to deliver reservoir pressure to said regulator valve to move said piston means thereof in said opposite direction, resilient means to move said modulating valve in said one direction and fluid conveying means connecting with said second control means to deliver fluid pressure to the modulating valve to move it in said opposite direction when said second control means delivers fluid pressure to the high range engaging means, whereby under conditions of relatively low vehicle speed and high engine torque a fluid pressure loss near the high range clutch means is compensated by the movement of the regulator valve piston means in said one direction by said regulator valve resilient means and said throttle pressure.

10. In a pressure regulating system as described in claim 9, said regulator valve including a vent port and said piston means being adapted to vent fluid pressure from said reservoir through said vent port when said piston means is moved the maximum distance in said opposite direction.

11. In a hydraulic control system for an accelerator pedal controlled engine having low and high driving ranges, an output shaft, a pressure reservoir, a self-compensating pressure regulating system comprising, a hydraulic clutch means connecting with the reservoir to engage the high range driven, pump means having intake and output ports to deliver fluid pressure to the reservoir, a regulator valve connecting with the reservoir and said output port of the pump means to regulate the fluid pressure in the reservoir, fluid conveying means connecting the regulator valve with said intake port of the pump means, said regulator valve including piston means movable in one direction to increase the fluid pressure delivered to the reservoir by said pump means and said piston means being movable in the opposite direction to decrease the fluid pressure delivered to the reservoir by said pump means, and to return the pump means output pressure to the valve port thereof, resilient means to move said piston means in said one direction, a throttle control valve operatively responsive to the speed increasing position of the accelerator pedal and connecting with the reservoir to deliver throttle pressure to the regulator valve which is substantially proportional to the speed increasing position of the accelerator pedal to move said piston means thereof in said one direction, a modulating valve connecting with the reservoir and said regulator valve, a speed responsive governor control operatively responsive to the speed of rotation of the output shaft connecting with said reservoir to deliver fluid pressure to the modulating valve which is substantially proportional to the speed of rotation of the output shaft, said modulating valve being movable in one direction to admit governor pressure to the regulator valve to move the piston means thereof in said opposite direction, and said modulating valve being movable in the opposite direction to admit reservoir pressure to said regulator valve to move said piston means thereof in said opposite direction, resilient means to move said modulating valve in said one direction, control means connected with the reservoir and responsive to a predetermined reduction in throttle pressure and an increase in governor pressure to deliver fluid pressure to said high range clutch means to engage the high range drive, and fluid conveying means connecting with said control means to deliver fluid pressure to the modulating valve to move the latter in said opposite direction when said control means delivers fluid pressure to engage the high range clutch means.

No references cited.